United States Patent [19]

Thoone et al.

[11] Patent Number: 4,758,959
[45] Date of Patent: Jul. 19, 1988

[54] VEHICLE NAVIGATION SYSTEM PROVIDED WITH AN ADAPTIVE INERTIAL NAVIGATION SYSTEM BASED ON THE MEASUREMENT OF THE SPEED AND LATERAL ACCELERATION OF THE VEHICLE AND PROVIDED WITH A CORRECTION UNIT FOR CORRECTING THE MEASURED VALUES

[75] Inventors: Martinus L. G. Thoone; Henricus P. M. Krukkert, both of Eindhoven, Netherlands

[73] Assignee: U.S. Philips Corporation, New York, N.Y.

[21] Appl. No.: 772,062

[22] Filed: Sep. 3, 1985

Related U.S. Application Data

[63] Continuation-in-part of Ser. No. 690,063, Jan. 9, 1985, abandoned.

[30] Foreign Application Priority Data

Aug. 14, 1984 [NL] Netherlands ............... 8402497

[51] Int. Cl.⁴ .................................. G06F 15/50
[52] U.S. Cl. ....................... 364/454; 364/449; 73/178 R; 340/990
[58] Field of Search ........... 364/449, 436, 565, 566, 364/443, 453, 454, 450; 73/178 R; 340/990, 995; 343/450, 451

[56] References Cited

U.S. PATENT DOCUMENTS

| | | | |
|---|---|---|---|
| 4,144,437 | 9/1978 | Krogmann | 364/453 X |
| 4,254,465 | 3/1981 | Land | 364/454 |
| 4,301,506 | 11/1981 | Turco | 364/436 |
| 4,318,300 | 3/1982 | Maughmer | 73/178 R |
| 4,360,876 | 11/1982 | Girault et al. | 364/449 |
| 4,507,737 | 3/1985 | La Sarge et al. | 364/453 |
| 4,514,810 | 4/1985 | Ito et al. | 364/424 |
| 4,535,335 | 8/1985 | Tagami et al. | 340/995 |
| 4,543,572 | 8/1985 | Tanaka et al. | 340/723 |
| 4,571,684 | 2/1986 | Takanabe et al. | 364/449 |

Primary Examiner—Parshotam S. Lall
Assistant Examiner—Thomas G. Black
Attorney, Agent, or Firm—David R. Treacy; Bernard Franzblau

[57] ABSTRACT

A navigation system for a road vehicle comprises a route-determining unit and position-locating means. The route-determining unit works together with a mass memory which stores geographic data of a road network. The route-determining unit determines a driving route between a starting point and a destination supplied by the driver of the vehicle. The position-locating devices determine the vehicle position coordinates recurrently from the speed and acceleration of the moving vehicle provided by a measuring unit. A correction unit derives a correction vector for correcting the generated vehicle position coordinates. The correction vector is determined by performing a transposition of the generated vehicle position coordinates to an actual road position as repeated by coordinates of the road network stored in the mass memory. An acceleration operator is derived from the measured speed and lateral acceleration and from the generated vehicle position coordinates. The acceleration operator operates on the correction vector in order to derive a correction value for the measured acceleration. A receiver receives position coordinate signal from a navigation satellite. A Kalman filter mixes the vehicle position coordinates with the position coordinates originating from the navigation satellite.

17 Claims, 8 Drawing Sheets

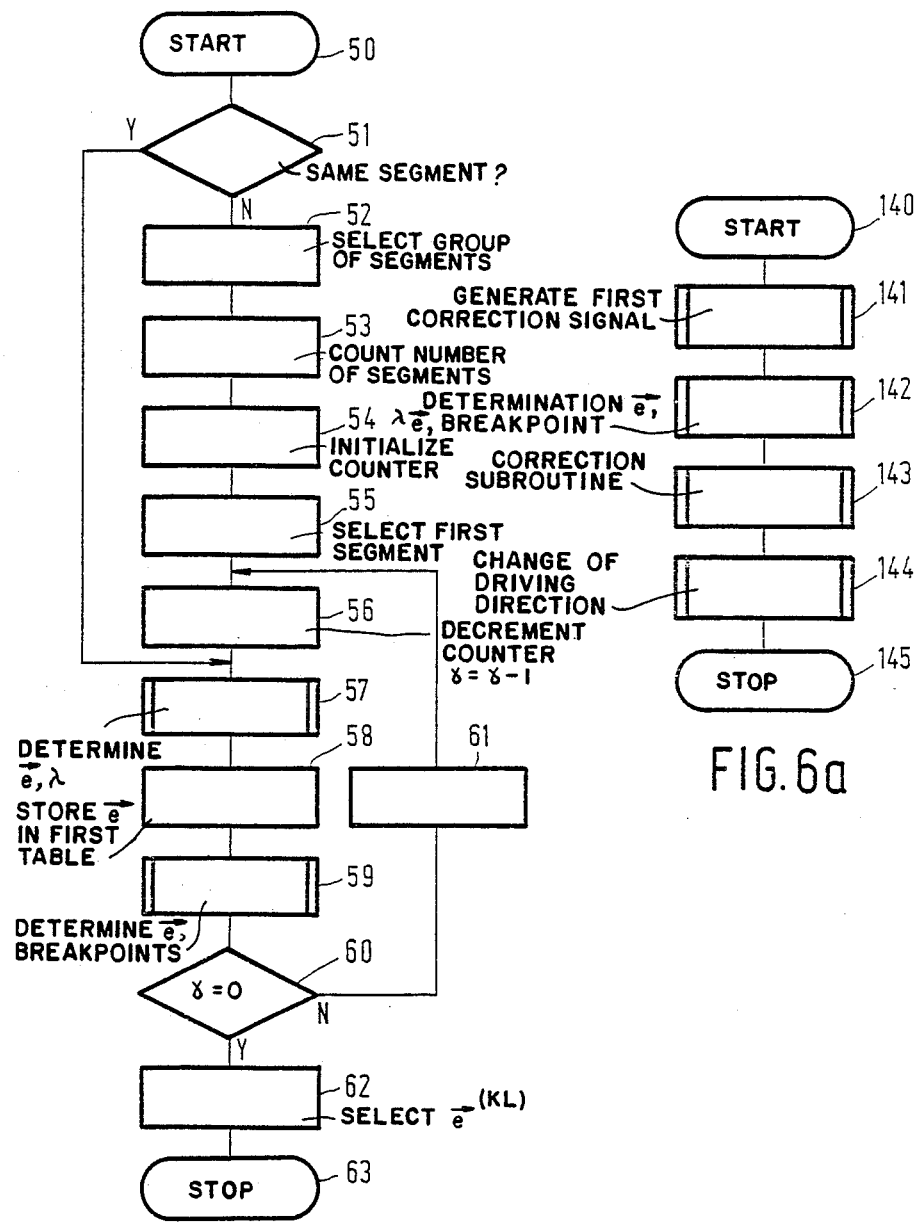

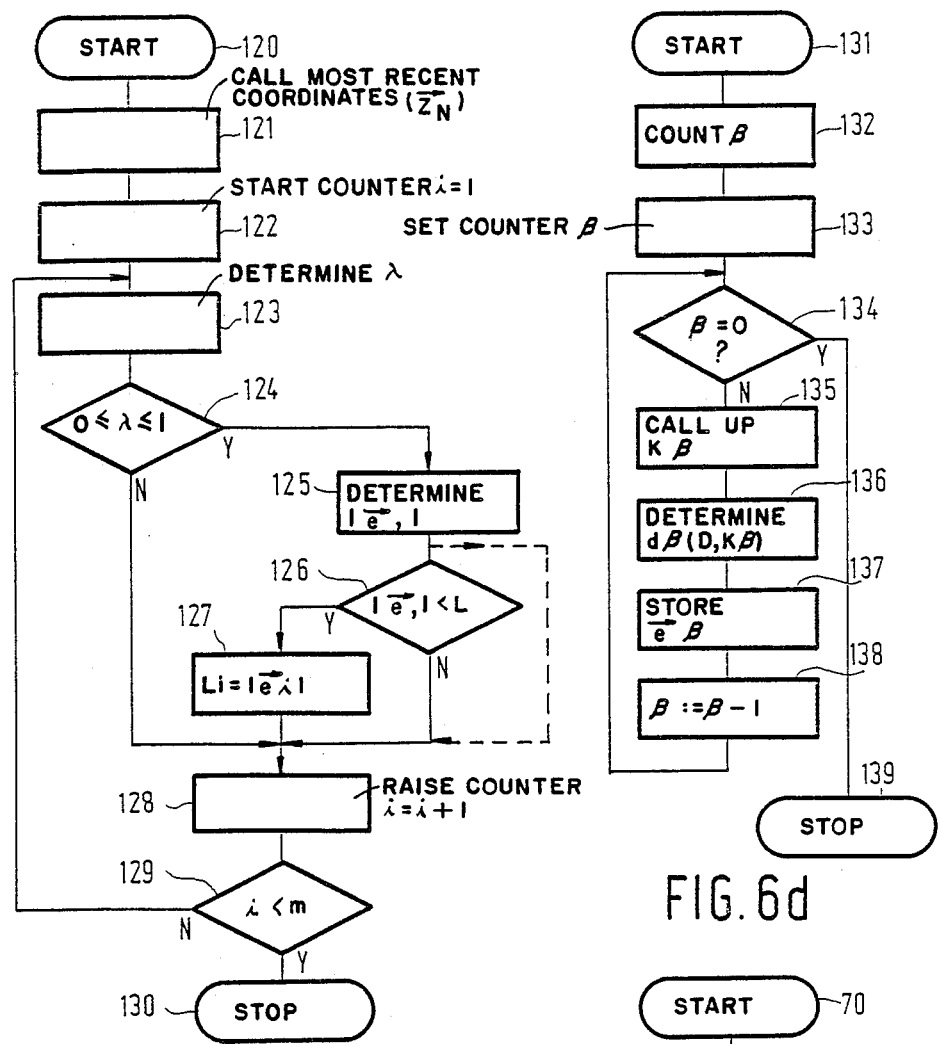
FIG.6c
FIG.6d
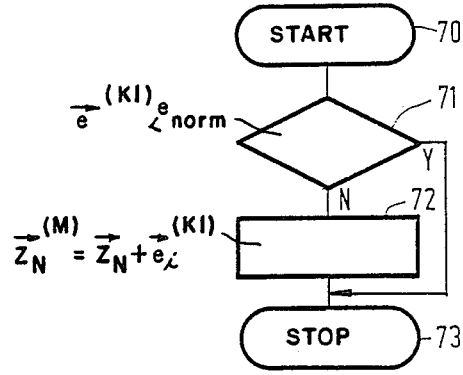
FIG.6e

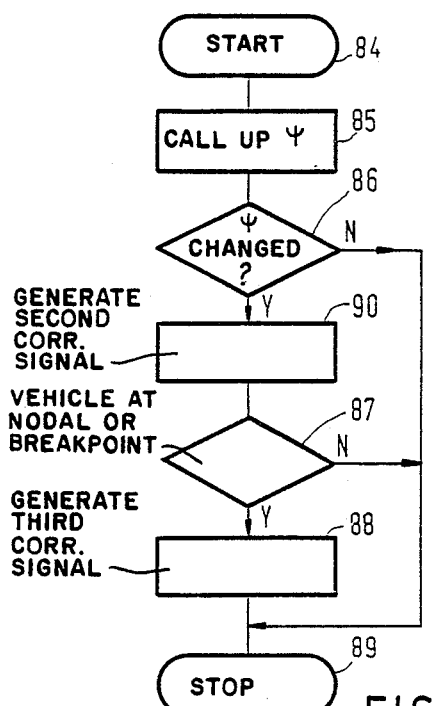
FIG. 9
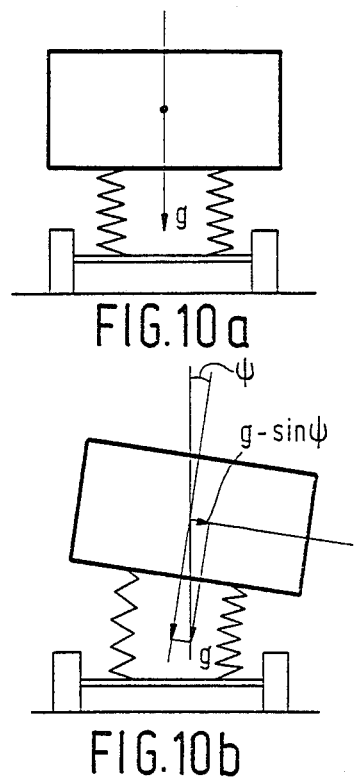
FIG. 10a
FIG. 10b
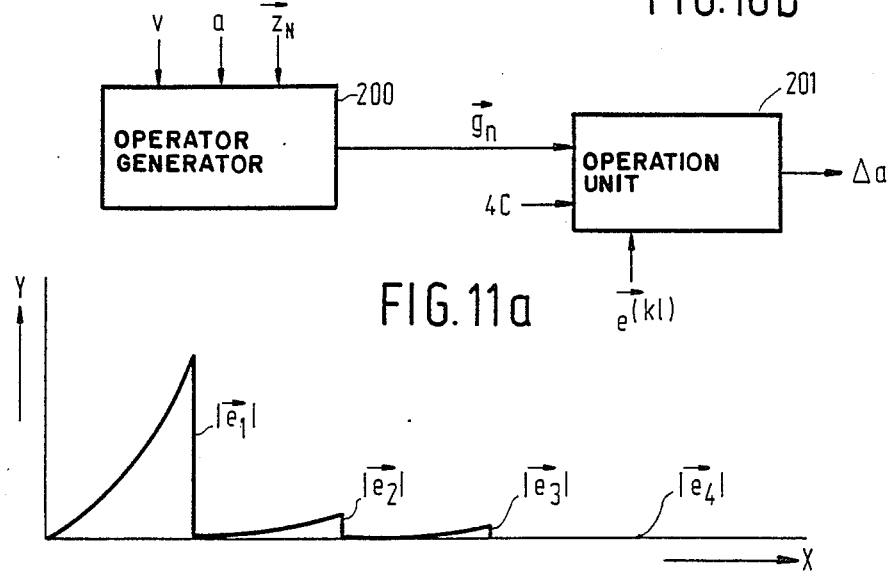
FIG. 11a
FIG. 12

VEHICLE NAVIGATION SYSTEM PROVIDED WITH AN ADAPTIVE INERTIAL NAVIGATION SYSTEM BASED ON THE MEASUREMENT OF THE SPEED AND LATERAL ACCELERATION OF THE VEHICLE AND PROVIDED WITH A CORRECTION UNIT FOR CORRECTING THE MEASURED VALUES

This is a continuation-in-part of application Ser. No. 690,063, now abandoned, filed Jan. 9, 1985.

This invention relates to a navigation system for a road vehicle, comprising a measuring unit which has a speedometer and which is linked with a central unit, a communication unit connected to the central unit for the input of a starting position and a destination and for the display of a driving route between starting position and destination. The central unit contains a mass storage device for storing geographic data of a road network. A control unit and position-locating devices are provided which are all connected with a common communication line. The control unit contains a route-determining unit for determining a driving route between the starting position and the destination by making use of the geographic data from the mass storage device. The position-locating devices have a first input which is connected with an output of the measuring unit for receiving measurement data and are provided in order to determine from the measurement data, after receiving the starting position, successive vehicle position coordinates and the driving direction of the vehicle in motion.

A navigation system of this kind is known from the article "Elektronischer Wegweiser, Ein Navigationssystem für Städte" published in the Journal Funkschau 23, 1983, pages 48–50. The navigation system therein described contains a mass storage device in which the geographic data of a road network, for example that of a town, are stored. By means of a communication unit which contains for example a keyboard, the driver of the vehicle makes his starting position and his destination known to the navigation system. Under the control of the control unit and by making use of geographic data of the road network, the route-determining unit determines a driving route which indicates the path to be followed between starting position and destination. The position-locating devices receive from the measuring unit the speed of the vehicle measured by the speedometer and the speeds of revolution of both rear wheels measured by wheel sensors. The position-locating devices determine therefrom the vehicle position coordinates and the driving direction from the difference in the speeds of revolution of the rear wheels. By comparison of the vehicle position coordinates with the geographic data that pertain to the driving route, the progression of the vehicle along the driving route can be followed and the correct navigational instructions can be communicated to the driver via the communication unit.

A disadvantage of the known navigation system is that the determination of the vehicle position coordinates and the driving direction is realised by measurements done with the aid of sensors which are fixed to both rear wheels of the vehicle. The determination of the driving direction from the difference in speed of revolution of the rear wheels is inaccurate because it is dependent on too many factors, such as for example wheel spin and unequal tire pressure, which factors are mutually incapable of correction. Another way of determining the driving direction is to use a magnetic compass. However, the bodywork of the vehicle and driving past objects that contain a large amount of iron disorient the compass.

An object of the present invention is to provide a navigation system whereby the position of the vehicle can be accurately determined with the position-locating device without the mentioned disadvantages occurring.

A navigation system in accordance with the invention is characterized in that the measuring unit contains an accelerometer for measuring the lateral acceleration of the vehicle and that position-locating means are provided in order to generate recurrently from the measured lateral acceleration and speed of the vehicle the successive vehicle position coordinates and the driving direction of the vehicle in motion.

An accelerometer is simple to implement and moreover correction of the measured signal can easily be determined since the measured acceleration signal is influenced by parameters that can be calculated. Further, the measurement of the lateral acceleration has the advantage that it is relatively easy to determine therefrom the driving direction. For of course the lateral acceleration is a yardstick of the change of direction of the vehicle.

The use of an accelerometer for determining the lateral acceleration of the vehicle and deriving position coordinates therefrom is in itself known from the U.S. Pat. No. 4,254,465. However, in the system therein described no use is made of a mass storage device and there is no route-determining unit. In a system in accordance with this U.S. patent the vehicle position coordinates are not determined solely from the measured speed and lateral acceleration.

The invention further relates to a navigation system which contains a correction unit connected to the communication line for determining a correction vector that gives the deviation between the vehicle position coordinates generated with position-locating devices and road position coordinates for a corresponding position on a part of the road which are originated from said mass storage device, and for correcting therewith the generated vehicle-position coordinates.

The correction unit periodically compares the vehicle position coordinates with road position coordinates representing the geographic data along the driving route. As a result of all kinds and causes of error, such as for example inaccuracy of the speed signal and drift in the electronics, considerable deviations may sometimes arise between the position of the vehicle as determined by the position-locating devices and the real position of the vehicle on the road. The correction unit determines a correction vector which gives the deviation between the vehicle position coordinates and stored road position co-ordinates for a corresponding position on a part of the road which is derived from the geographic data. This correction vector is then used for applying a correction to the vehicle position coordinates.

A navigation system in accordance with the invention is further characterized in that the geographic data of the road network contain a set of segments whereby each segment represents from the road network a part of the road that is bounded by two nodal points and is identified at least by the coordinates of these two nodal points, and which correction unit is provided with transposition means for determining, under the control of a first correction signal generated by the control unit, for each segment from a group of segments situated within a given radius around a generated vehicle position coordinate, a transposition of the generated vehicle position coordinate to transposed position coordinates for a transposed vehicle position situated near the relevant segment, which transposition means are further provided for generating the correction vector that gives the distance between the calculated vehicle position and its transposed positions. The correction unit is further provided with selection means for selecting from these generated correction vectors that vector which has the smallest distance among the said distances that belong to the same group. The correction is made on the basis of the selected correction vector.

The arranging of the geographic data relating to the road network in a set of segments and the assigning of coordinates to those segments makes it possible to compare the generated vehicle position coordinates with coordinates from those segments. This comparison is done by the transposition means which transpose the generated vehicle position coordinates to coordinates pertaining to a group of segments situated near the generated vehicle position coordinates. For each segment from the group, a transposition is determined and upon each transposition the distance between the generated vehicle position and the transposed vehicle position is determined. That distance then gives a correction vector which indicates the correction that must be applied to the generated vehicle position coordinates. In order to determine to which of the segments of the said group the generated vehicle position coordinates belong, a selection must be made between the generated correction vectors. This selection is done by the selection means, which select the correction vector with the smallest value. In this way a correction unit is realised with which, in a relatively simple manner and on the assumption that the vehicle is able to move only along the road, corrections can be applied to the generated vehicle position coordinates. Further, since the vehicle position coordinates are determined recurrently, use can be made of the corrected vehicle position coordinates when determining subsequent vehicle position coordinates so that cumulative error effects are eliminated. So a dead reckoning system is then formed.

A first preferred embodiment of a vehicle navigation system in accordance with the invention is characterized in that segments for parts of roads which run along a straight line form a first subset of the set of segments, and whereby the straight part of a road is represented by one section, and whereby the transposition means perform a transposition by determining the perpendicular projection of the generated vehicle position coordinate onto the section of the relevant segment, and validates the transposition when the transposed position is a point of that section.

A second preferred embodiment of a vehicle navigation system in accordance with the invention is characterized in that segments for parts of roads which follow a curved line form a second subset of the set of segments, the curved part of a road is divided into a number of sections, whereby the transposition means perform a transposition by determining the perpendicular projection of the generated vehicle position coordinate onto at least one section from the said number of sections and declares the transposition to be valid when the transposed position is a point of one of the sections.

The subdivision of the set of segments into a first subset containing the straight parts of the road network and a second subset containing the curved parts of the road network gives a refinement in the distribution which simplifies the transposition. For of course by dividing the part of the road network by one (straight road) or more sections, a perpendicular projection can be made from the generated vehicle position coordinate onto such a section. The determination of a perpendicular projection onto a section is simple to realise under control of a microprocessor. The selection for determining in respect of which segment of the said group the generated vehicle position coordinate belongs is improved in this way, namely by ascertaining whether the perpendicular line from the calculated vehicle position does in fact bisect a point belonging to the section and not a point situated on an extension of the section. For, if the point of intersection lies in the extension of the section, then this is not a point that belongs to the part of the road and thus the transposition cannot be regarded as being valid.

A third preferred embodiment of a navigation system in accordance with the invention is characterized in that the point of intersection of two successive sections from the said number forms a breakpoint and the transposition perform a transposition by determining the distance between the calculated vehicle position coordinates and at least one breakpoint.

In the case of curved parts of the road this offers a supplementary possibility for performing the transposition and thus increases the accuracy of the navigation system.

A fourth preferred embodiment of a navigation system in accordance with the invention, whereby for each segment the axis of the appertaining part of the road is parametrised by means of at least one section, is characterized in that the transposition means perform a transposition by determining the distance travelled between a reference point of the relevant segment and the calculated vehicle position coordinate, and subsequently transposing this distance on the sections of the relevant segment, thereby taking the reference point as the point of departure.

When use is made of an accurately calibrated speedometer, the path travelled can accurately be determined. The accurately determined path travelled is then transposed to the part of the road, which then quite simply gives the transposed coordinates. When the vehicle is provided with a calibrated speedometer, this system provides a very attractive and easily implemented solution which, in addition, possesses a relatively high accuracy.

A fifth preferred embodiment of a navigation system in accordance with the invention is characterized in that the central unit, connected with the position-locating means, contains detection means which are provided in order to detect from the driving direction, as determined with the position-locating means, large momentary changes in the driving direction of the vehicle and for generating a second correction signal upon ascertaining a large momentary change in the driving direction. The detection devices are connected with the route-determining unit and are provided in order, under control of the second correction signal, to retrieve driving route coordinates and to ascertain whether these momentary driving route coordinates contain the coordinates of a nodal point or a break-point and, in establishing coordinates of a nodal point or a breakpoint, to generate a third correction signal, which transposition means are operable to determine a correction vector under control of a received third correction signal. A large momentary change in the driving direction occurs when the vehicle takes a sharp bend in the road (breakpoint) or when it changes direction at a nodal point. When such a large change in the driving direction occurs and the vehicle is situated in the vicinity of a breakpoint or nodal point, which can be ascertained on the basis of the driving route, then it is possible to replace the generated vehicle position coordinates by those for the breakpoint or nodal point under control of the correction vector. The detection means thus provide a supplementary improvement of the navigation system and so make it more reliable.

A sixth preferred embodiment of a navigation system in accordance with the invention is characterized in that the correction unit contains an operator generator for generating from the measured speed and lateral acceleration of the vehicle and from the generated vehicle position coordinate an acceleration operator. The correction unit further contains an operation unit which has a first input connected with the selection unit for receiving the selected correction vector and a second input connected with the operator generator for receiving the acceleration operator and a third input connected with the control unit for receiving a fourth correction signal. The operation unit is provided for causing the acceleration operator to operate on the selected correction vector under control of the fourth correction signal and for generating therefrom a correction value for the measured acceleration. The generated acceleration operator operates on the selected correction vector and from this a correction value is then determined for the measured acceleration. The determination of a correction value for the measured acceleration makes it possible to correct measuring errors in the acceleration measured with the accelerometer and in this way to produce a more accurate value of the measured acceleration.

A seventh preferred embodiment of a navigation system in accordance with the invention is characterized in that the operation unit has an output connected with the position-locating means for delivering the correction value to the position-locating means, which are provided in order to take up said correction value in the measured lateral acceleration.

Since the vehicle position coordinates are generated from the measured acceleration and speed, whenever a correction is applied with the aid of the correction value to the measured acceleration, the acceleration value will be more accurate and in this way the vehicle position coordinates will also be determined with greater accuracy.

It is advantageous that the central unit contains a non-volatile memory element which contains a control input for receiving an enabling pulse generated upon the stopping of the vehicle and which non-volatile memory is provided for storing the last generated vehicle position coordinates under control of the enabling pulse and for preserving these vehicle position coordinates when the vehicle is stationary. Since the destination of one journey is usually the starting point of the next journey, and since the coordinates of that destination have been determined with great accuracy, it is advantageous to store in the non-volatile memory the vehicle position coordinates that were generated just before the vehicle was stopped. In this way, upon a subsequent journey they are then retrieved from the non-volatile memory and the starting point of the next journey is at once known.

A more elaborate embodiment of a navigation system in accordance with the invention is characterized in that the navigation system comprises a receiving unit connected to the communication line for receiving position coordinate signals originating from a navigation satellite, and that the central unit comprises a mixing unit connected to the communication line for mixing, under the control of a mixing signal generated by the control unit, a set of generated vehicle position coordinates with position coordinates received from the navigation satellite. The last-mentioned generated vehicle position coordinates and received position coordinates relate to the same position. The mixing unit comprises a Kalman filter for realizing the said mixing and the mixing unit is connected in the correction unit for receiving the correction value and/or the correction vector.

By combining a satellite navigation system with a dead reckoning navigation system it is possible to determine the vehicle's position more accurately. As a matter of fact, the deviation of the generated vehicle position coordinates is not correlated with the deviation on the position coordinates originating from the satellite. By mixing the two position coordinates which relate to the same position by means of a Kalman filter, optimum position coordinates of the vehicle are determined. The mixing signal ensures that at suitable instants, when, for the same referred position, both generated vehicle position coordinates and position coordinates originating from the satellite are available, they are combined. The Kalman filter also uses the correction value and/or the correction vector for mixing the position coordinates.

The invention will now be further described by way of example with reference to the accompanying drawings, in which:

FIG. 6a is a flow chart of a main program for the operations of the correction unit;

FIG. 6b is a flow chart of a subroutine "segment determination";

FIG. 6c is a flow chart of a subroutine "determination of $\vec{e}, \lambda$";

FIG. 6d is a flow chart of a subroutine "determination of $\vec{e}$, breakpoints";

FIG. 6e is a flow chart of a correction subroutine;

FIG. 9 is a flow chart of a subroutine "change in driving direction";

FIGS. 10a and 10b show two orientations of a vehicle;

Figure 11B:
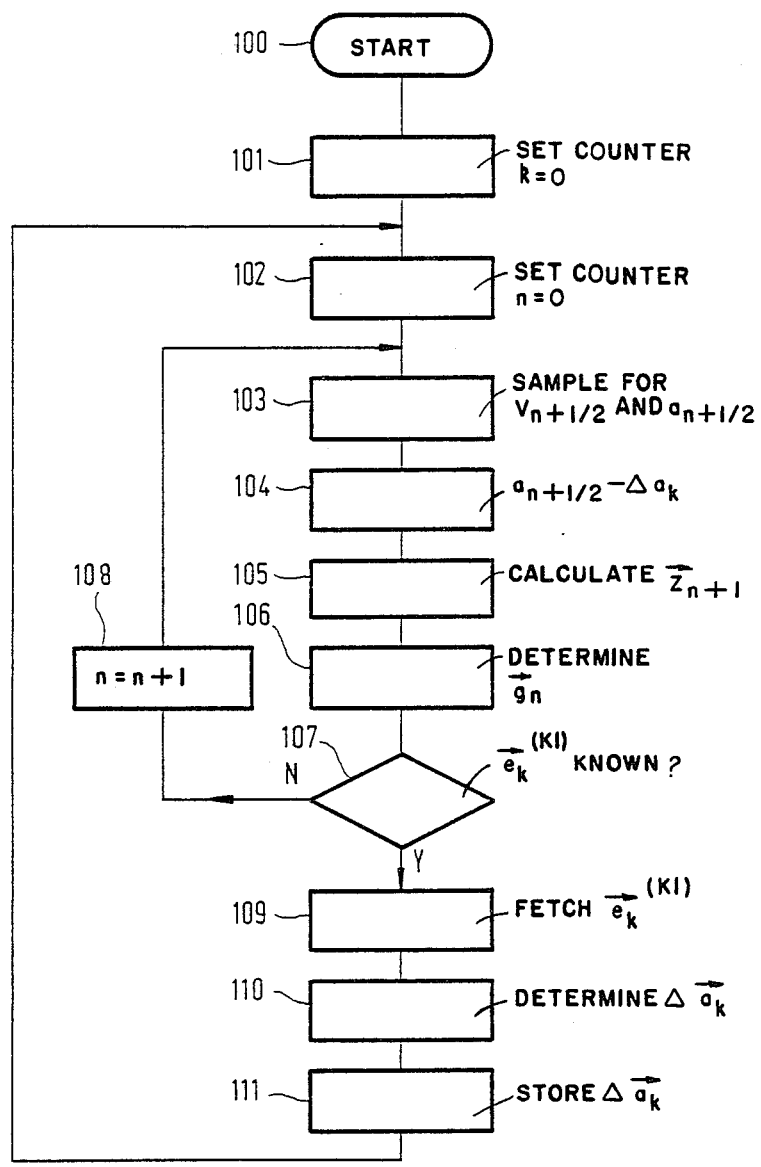
Figure 13:
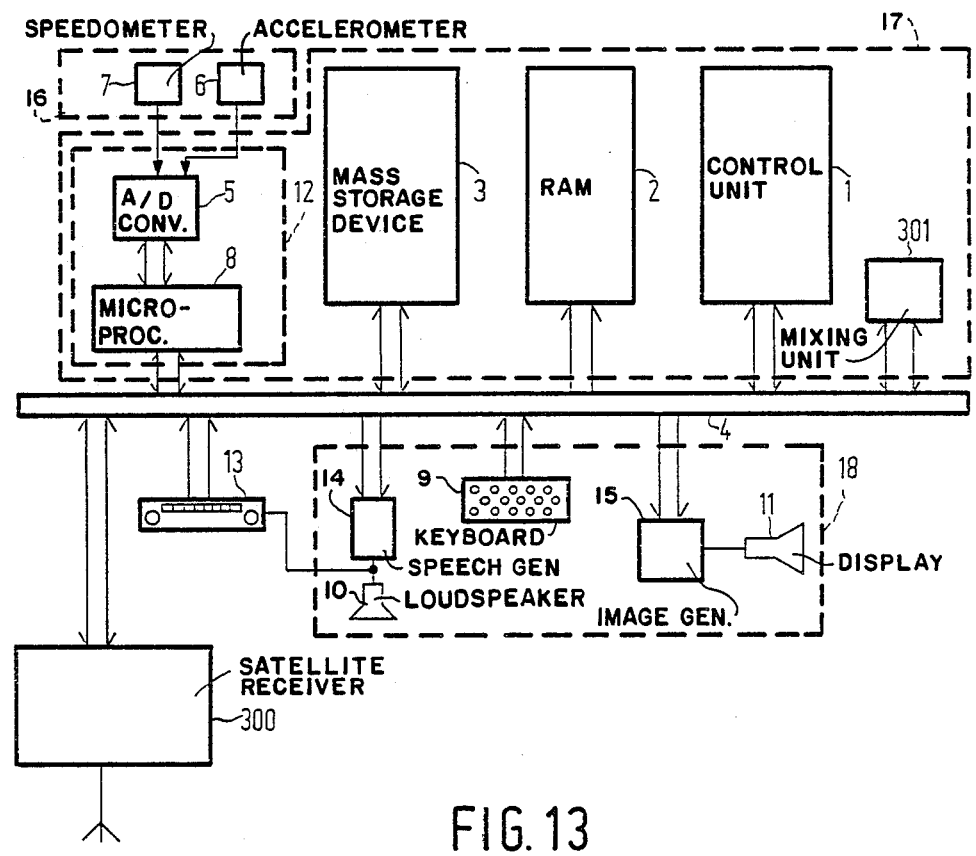

FIG. 11a gives an example of a hardware implementation for determining the correction values;

FIG. 11b is a flow chart of an a-correction program for determining a correction value to be applied to the acceleration signal;

FIG. 12 gives an example of calculated vehicle position corrections by making use of the program from FIG. 11b, and FIG. 13 shows an embodiment of a vehicle navigation system in which a dead reckoning data processing system and a satellite navigation system are combined.

Figure 1A:
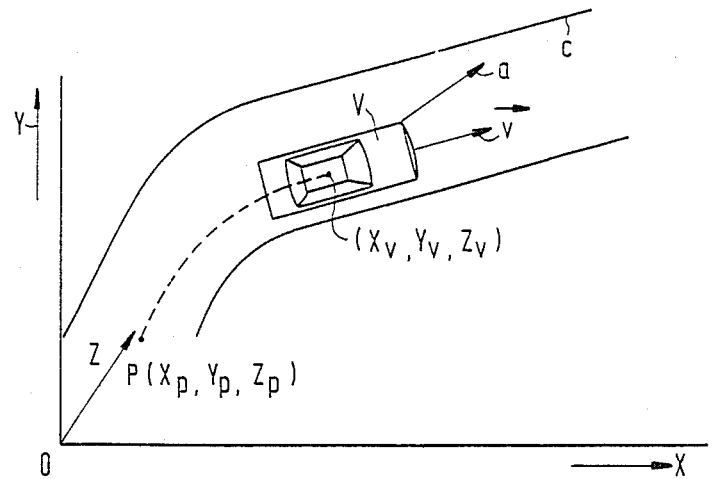
FIG. 1a shows a vehicle that is moving along a road.
Figure 1B:
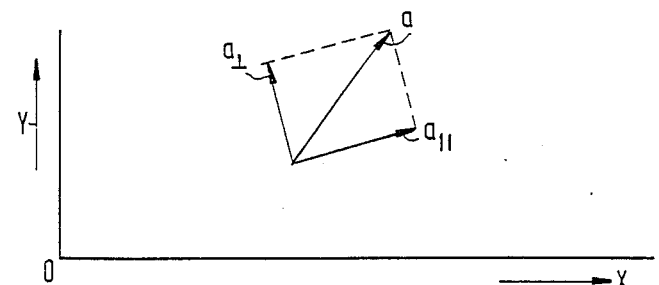
FIG. 1b shows the vector analysis of the acceleration vector of the vehicle.

FIG. 1(a) illustrates a vehicle V that is moving along a road C. The road and the vehicle are localised in a reference system (at rest) with coordinates x, y, z. At each moment the vehicle is situated at a position $(x_v, y_v, z_v)$ in that reference system. The starting position of the vehicle is indicated by the coordinates $(x_p, y_p, z_p)$ of the starting point P. When the vehicle travels at a speed v in the forward direction it also experiences an acceleration a. The acceleration vector a can, as is known for vectors, be analysed into a parallel component $\vec{a}_{\parallel}$ and a component $\vec{a}_{\perp}$ perpendicular to the path of the vehicle. FIG. 1(b) shows this vector analysis. In the further description only the lateral acceleration component $\vec{a}_{\perp}$ will be considered and this will be denoted simply by $\vec{a}$. Since the lateral acceleration is always perpendicular to the path of the vehicle, it is possible to derive information about the driving direction of the vehicle from the lateral acceleration.

With a land vehicle navigation system in accordance with the invention, use is made of the speed and the lateral acceleration for determining the position at which the moving vehicle is located. The magnitude of the speed v of the vehicle is measured in conventional manner, for example by means of a speedometer. For measuring the scalar value a of the lateral acceleration a, the vehicle is provided with an accelrometer. The principle of an accelerometer is for example described in Proceedings IEE, Vol. 12b, No. 11R, Nov. 1979, IEE Reviews, p 1043-1045. A calibrated speedometer in a vehicle is a reasonably reliable and sufficiently accurate instrument. A simple accelerometer is however not sufficiently accurate, so that corrections to the measured value are necessary. In the further description this correction will be dealt with in more detail.

Figure 2:
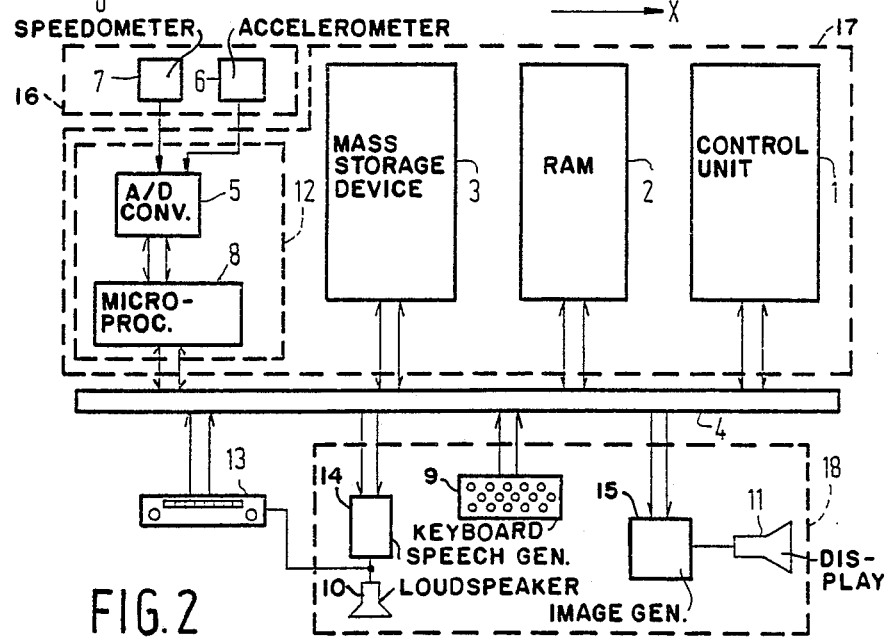
FIG. 2 shows the main components of a vehicle navigation system in accordance with the invention.

FIG. 2 shows the main components of a vehicle navigation system for a vehicle built to move over roads on land in accordance with the invention. The vehicle navigation system contains a control unit 1, for example a first microprocessor (Motorola 68000) which is connected to a communication bus 4 for transporting data, addresses and control signals. Also connected to this bus are a working memory 2, for example a RAM, and a mass storage device 3. The mass storage device 3 is formed by a Compact Disc memory (CD-ROM) which can be played on a Compact Disc player which, for example, forms part of a sound installation with which the vehicle is equipped. Stored on this Compact Disc in the form of digital data are geographical data on the road network of a country or a part thereof as well as town maps with street names, sights of interest, hotels etc. of that country. The navigation system further contains a measuring unit 16 provided with an accelerometer 6 and a speedometer 7 (which may possibly be an odometer) which are connected with respective inputs of an analog-digital converter 5. The analog-digital converter 5 is in its turn connected with a second microprocessor 8. The analog-digital converter 5 and the second microprocessor 8 together form the position-locating means 12 of the vehicle navigation system. The position-locating means constitute a dead-reckoning data processing system. This second micro-processor calculates inter alia the position coordinates of the vehicle from the speed v and the lateral acceleration a measured by the speedometer 7 and the accelerometer 6. The second microprocessor 8 is likewise connected with the bus 4. Also connected with the bus 4 is a communication unit 18 which contains a keyboard and/or data pad 9. By means of this keyboard and/or data pad the user introduces data into the navigation system. The data are for example the starting position, the destination and possible preferences such as a route via a main highway or a tourist road. The communication unit 18 further contains a loudspeaker 10 which is connected via a speech generator 14 to the bus 4, and further an image generator 15 to which a display device 11 is connected. The loudspeaker 10 may form part of the sound installation with which the vehicle is equipped. Through the loudspeaker and/or the image display device the user is given information on the road to be followed in order to reach the destination. It is not necessary for the navigation system to contain both the loudspeaker and the image display device; one of the two is sufficient. It is also possible to connect the digital output of the car radio 13 with the bus 4. This is particularly advantageous when the car radio is provided for receiving digital traffic information by the Radio Data System (RDS). This traffic information can be taken up in the navigation system and processed therein. In this way, when determining the road to be followed, account can be taken of possible tailbacks, or warnings can be given of dangerous situations such as for example a vehicle travelling in the wrong lane of a motorway or an icy surface. RDS is a system in which digital traffic information can be transmitted on a subcarrier (57 kHz) for the stereo radio signal without interfering with the latter.

An alternative to the keyboard and/or data pad 9 is, for example, a microphone coupled with a speech recognition device in order to give information orally to the navigation system.

The control unit 1, the mass memory 3, the working memory 2 and the position-locating means 12 constitute the central unit 17 of the vehicle navigation system.

Before going further into the operation of the navigation system in accordance with FIG. 2, it is necessary to explain the geographic data stored in the Compact Disc in more detail.

Figure 3:
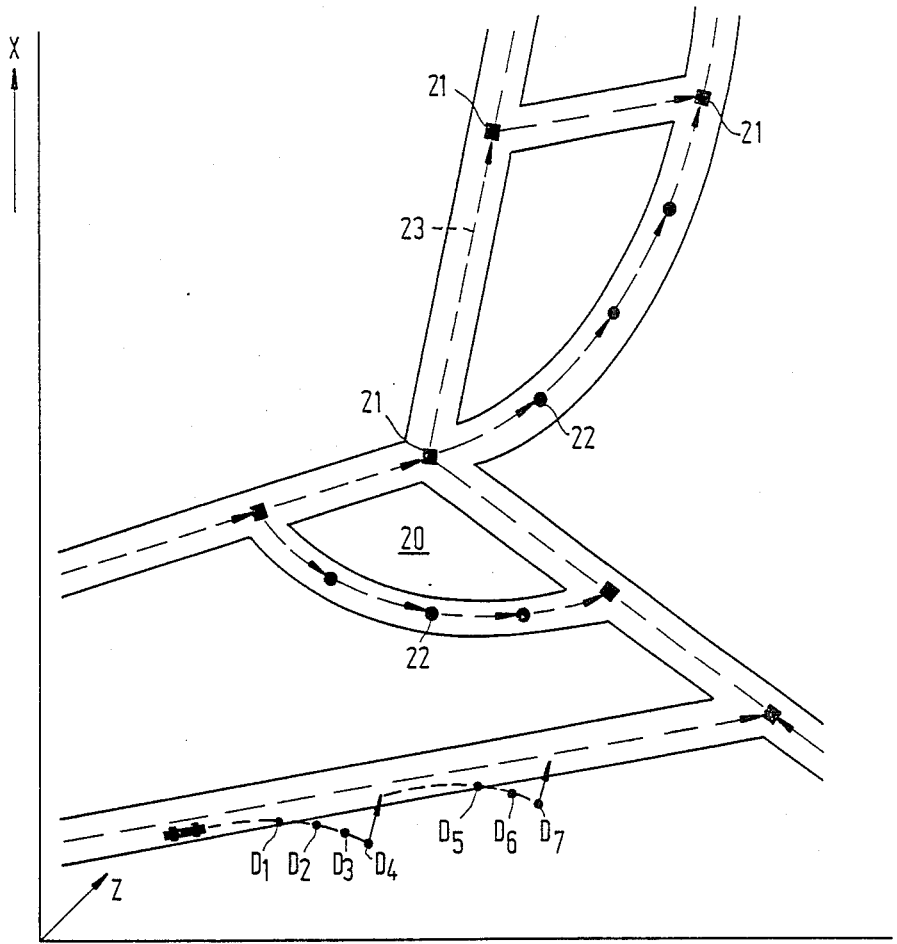
FIG. 3 shows a road network.

FIG. 3 illustrates a part of a road network 20. The translation of the road data is based on the axes of the roads which are divided into straight line sections. Each line section has a starting point and an end point. To each starting and end point belong coordinates, which represent the coordinates (x, y, z) of a position vector with respect to an origin of a reference system. Each line section can also be represented by at least one position vector in that reference system. Two or more roads intersect each other at a nodal point 21 which is also represented by means of a position vector. The position vectors pertaining to the same part of the road are denoted as a segment. A segment is always bounded by two nodal points. A road network thus contains a set of segments. When the road is a straight road (23) then the segment is represented by only one vector, together with the vector for the two nodal points which bound the segment. When, on the other hand, the road follows a curved line, then a segment contains in addition a number of breakpoints. A breakpoint 22 represents the initial point of a subsequent position vector which describes a section of a curved road. The straight road segments form a first subset of the set of segments and the curved road segments form a second subset.

Also belonging to a segment are a place name and street name, or a road number, depending on the location of that segment, which are also stored on the Compact Disc. This makes it possible to search on the basis of place and street names or road number. In general such a segment is stored in the Compact Disc by means of a data block. The data block then contains:

the province or the district
the location (town, village, etc.)
street name or road number
coordinates x, y, (and z when working three-dimensionally)
breakpoint coordinates for a curved segment.
weight factor $\phi$, characterising the nature of the road.
  Thus, for example, a main highway (motorway) is allotted a low weight factor and a shopping street a high weight factor;
the two nodal points of the segment are characterised as such (for example by means of one or more well-determined bit values or well-determined positions in the data block);
an indication of a one-way or two-way street, with direction indication for one-way traffic;
roads that connect to that segment are also included in the relevant data block by means of coding and addresses that refer to other memory locations;
a reference to a location where particular information, such as the presence of traffic lights, obstructions and other topological data of the segment.

Other information can also be stored in the Compact Disc, such as for example addresses (and telephone numbers) of hotels, petrol stations, etc.

The use of a Compact Disc as a mass storage device for a vehicle navigation system offers many advantages, mainly the large storage capacity (main storage: 4, $4 \times 10^9$ bits) and the random access capability which makes reasonably rapid retrieval of data possible. The use of a Compact Disc player in a vehicle for inter alia navigation purposes is described in the proceedings of the SAE conference, Detroit, Mich., Feb. 27-Mar. 2, 1984 entitled "Application of the Compact Disc in Car Information and Navigation Systems" by M. Thoone and R. Breukers (Publication number 840156).

When a driver of a vehicle, which is fitted with a navigation system as illustrated in FIG. 2, wishes to use that navigation system, he will begin by entering into the navigation system via the keyboard or data pad 9 his starting position (district, location, street name or road number), and also his destination. The starting position can for example also be called up from a nonvolatile memory designed for the purpose, in which is stored the position last reached by the vehicle as determined from a preceding navigation operation. It is possible to provide the navigation system with a number of options by which the driver can communicate to the navigation system one or more preferences, such as for example a preferred route via a motorway or via a circular road instead of right through a town. Making preferences known is done for example by means of a question and answer dialogue between the navigation system and the driver. The navigation system reports the possible alternatives for example by means of questions which appear on the display screen 11 and the driver answers via the keyboard 9. In determining the route to be followed the navigation system then takes the driver's wishes into account.

After the driver has communicated the necessary data to the navigation system, the data for a number of segments is then, under control of the control unit 1, called up from the mass storage 3 and stored in the working memory 2. The working memory and the control unit together fulfill the task of a route-determining unit. The number of segments comprises the segments that are needed for determining the route. The purpose of calling up this number of segments is that, when a CD ROM is used as a mass storage, the Compact Disc player need only very briefly be used for navigation purposes, so that the player can be used during the rest of the journey for playing audio discs, and it further serves for retrieval to allow quick and automatic determination of the route.

Determination of the route to be followed and the giving of navigation information to the driver are done in the known manner, as described for example in "Forschung Strassenbau and Strassenverkehrstechnik, Heft 222, 1978" and published by the German "Bundesminister für Verkehr" in Bonn.

A more detailed account will now be given of the determination of the vehicle position coordinates during the movement of the vehicle along the road. The initialisation of the navigation system is done after the driver has communicated his starting position to the navigation system, for example by means of information (street name) of a first nodal point, and at the moment that he reaches that first nodal point after driving away with his vehicle. At that moment the driver initialises the navigation system for example by depressing an initialisation key. The coordinates $(x_0, y_0)$ belonging to that first nodal point are read from the back-up store and are regarded as the initial coordinates of the route. The starting value of the directional angle $\phi_0$ determined relative to a reference direction, for example west-east, is established by asking the driver in which street or on which road (road number) he intends to drive after crossing the first nodal point, or by means of a simple compass. With the initial coordinates $(x_0, y_0)$ as the point departure, the first microprocessor now determines an address for a subsequent vector which is to be called up from the working memory and which identifies a next segment on the route to be taken by the vehicle.

The path over which the vehicle travels is calculated with the aid of the lateral acceleration determined by the accelerometer 6 and the speed measured by the speedometer 7. The analog-digital converter 5 translates the measured analog acceleration and speed values into digital values which are subsequently delivered to the second microprocessor 8. From these digital acceleration and speed values the position-locating devices now calculate the vehicle position coordinates of the moving vehicle as described in the following.

Figure 4:
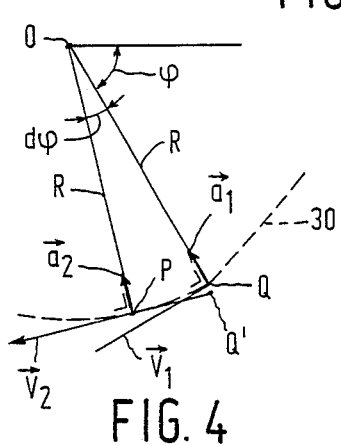
FIG. 4 depicts the change in the speed vector and the acceleration vector with a moving vehicle.

FIG. 4 illustrates the change in the speed vector and the acceleration vector with a vehicle in motion. The vehicle moves over a path 30 and at the time $t_1$ at the place Q it experiences a velocity $\vec{v_1}$ and a lateral acceleration $\vec{a_1}$. The path is approximated by describing a segment of a circle of radius R relative to a centre point 0.

At the time $t_2$ the vehicle is situated at the place P and now experiences a velocity $\vec{v_2}$ and a lateral acceleration $\vec{a_2}$. In the time interval $dt = t_2 - t_1$, which is infinitely small, the vehicle has thus travelled over a path ds along the road (circumference of the circle) and the directional angle of the vehicle has changed by $d\phi$. In $\Delta OPQ'$, $\hat{P}=90°$, since $OP\perp \overrightarrow{v_2} \Delta OPQ'$ is thus a right-angled triangle.

Now $d\phi < < 1$ rad, such that Q and Q' virtually coincide and $$\tan d\phi \approx d\phi \tag{1}$$

Further, $$ds \approx vdt \tag{2}$$

and $$ds \approx PQ' \tag{3}$$

In $\Delta OPQ'$, we now have $$tg\, d\phi = (PQ'/R) \tag{4}$$

Substituting (1), (2) and (3) in (4) gives $$d\phi = (vdt/R)$$

or $$R\, d\phi = vdt \tag{5}$$

Further the vehicle experiences the centripetal force $$F_{cp} = (mv^2/R) \tag{6}$$

an Newton's third law $$F_a = m.a. \tag{7}$$

is valid (here m represents the mass of the vehicle). Since the vehicle is in equilibrium on the road, we can write:

$$F_{cp} = F_a \rightarrow (mu^2/R) = ma$$

$$R = v^2/a \tag{8}$$

Substituting (8) in (5) now gives:

$$\begin{cases} Rd\phi = vdt \\ R = \frac{v^2}{a} \end{cases} \begin{cases} \frac{v^2}{a} d\phi = vdt \\ v\dot\phi dt = adt \end{cases}$$

$$\dot\phi = \frac{a}{v} \tag{9}$$

From the physical interpretation of the expression (9) one learns that the quotient of lateral acceleration a and velocity v gives the change in the driving direction.

With (x, y) as path coordinates of the vehicle and $\phi$ as the driving direction we can now draw up a next set of differential equations.

$$\begin{cases} \dot\phi = \frac{a}{v} \\ \dot x = v\cos\phi \\ \dot y = v\sin\phi \end{cases} \tag{10}$$

Now substituting $c = \cos\phi$ and $p = \sin\phi$ then $$\dot c = -p\dot\phi \tag{11}$$
$$\dot p = c\dot\phi$$

Substituting (9) in (11) then gives:

$$\dot c = (-pa/v)$$
$$\dot p = (ca/v)$$

We now define the vehicle position vector as $$\vec z = \begin{pmatrix} \dot c \\ \dot p \\ \dot x \\ \dot y \end{pmatrix}$$

Then $$\dot{\vec z} = \begin{pmatrix} \dot c \\ \dot p \\ \dot x \\ \dot y \end{pmatrix} = \begin{pmatrix} \frac{-ap}{v} \\ \frac{ac}{v} \\ vc \\ vp \end{pmatrix} \tag{12}$$

or $$\dot{\vec z} = \vec f(z,t)$$

where $\vec f(\vec z, t)$ gives the vehicle path algorithm.

The set of differential equations (12) is now solved numerically and periodically with a period $\tau$ ($\tau \approx 0, 1s$) by the second microprocessor 8. To that end sampling is done with that period $\tau$ and under control of the second microprocessor for the values of v and a measured by the speedometer and the accelerometer.

Discretisation in accordance with the mid-point rule then gives with a sampling period $\tau$ for the vehicle path algorithm $$\vec f\left(\frac{\vec z_{n+1} + \vec z_n}{2}, (n+\tfrac{1}{2})\tau\right) = \frac{\vec z_{n+1} - \vec z_n}{\tau} \tag{13}$$

where $\vec z_{n+1}$ and $\vec z_n$ represent two successive values of the vehicle position vector at the times $(n+1)\tau$ and $n\tau$.

Substituting (13) in (12) now gives $$\frac{1}{\tau}\left[\begin{pmatrix} c_{n+1} \\ p_{n+1} \\ x_{n+1} \\ y_{n+1} \end{pmatrix} - \begin{pmatrix} c_n \\ p_n \\ x_n \\ y_n \end{pmatrix}\right] = \begin{pmatrix} -\left(\frac{a_{n+\frac{1}{2}}}{v_{n+\frac{1}{2}}}\right) * \left(\frac{p_{n+1} + p_n}{2}\right) \\ \left(\frac{a_{n+\frac{1}{2}}}{v_{n+\frac{1}{2}}}\right) * \left(\frac{c_{n+1} + c_n}{2}\right) \\ (v_{n+\frac{1}{2}}) * \left(\frac{c_{n+1} + c_n}{2}\right) \\ (v_{n+\frac{1}{2}}) * \left(\frac{p_{n+1} + p_n}{2}\right) \end{pmatrix} \tag{14}$$

This equation (14) gives a solution for the vehicle path algorithm. The values $a_{n+\frac{1}{2}}$ and $v_{n+\frac{1}{2}}$ give respectively the acceleration and the speed as sampled at the moment $(n+\frac{1}{2})\tau$. The vehicle path algorithm thus contains a system of four equations with four unknowns ($c_{n+1}$, $p_{n+1}$, $x_{n+1}$, $y_{n+1}$). The values $c_n$, $p_n$, $x_n$ and $y_n$, abbreviated to $\vec{z}_n$, are known from a previous solution of the algorithm. For a first solution of the algorithm, one uses for the value $\vec{z}_n$ the initial coordinates $c_0 = \cos\phi_0$, $p_0 = \sin\phi_0$, $x_0$ and $y_0$ generated upon the initialisation of the navigation system. A solution $\vec{Z}_{n+1}$ of the vehicle path algorithm thus represents a vehicle position vector. The vehicle path algorithm is recurrently solved, since of course use is made of $\vec{Z}_n$ for calculating $\vec{Z}_{n+1}$.

However, as a result of the presence of errors in the measured values of $V_{n+\frac{1}{2}}$ and mainly of $a_{n+\frac{1}{2}}$ (inaccuracies due to the measuring instruments), a deviation occurs between the calculated vehicle vector $\vec{Z}_{n+1}$ and the corresponding actual position of the vehicle. The latter is illustrated in FIG. 3 where the points $D_i$ represent the calculated coordinate points of the vehicle position vectors. Since use is consistently made of previously calculated coordinate points of the vehicle position vector, a cumulative effect occurs as a result of which the deviations relative to the actual vehicle position becomes steadily larger. It is thus necessary to apply a correction to the calculated coordinates for the vehicle position vector. If it is now assumed that the vehicle can move only along the road, the calculated position can be regularly corrected. This is done by comparing the generated vehicle position coordinates with the coordinates of the nearest segment of the actual path as stored in the mass storage device. A first method of correcting the calculated coordinates for the vehicle position vector comprises a transposition whereby a perpendicular line from the calculated coordinate point for the vehicle position vector is projected on to the actual path position vector for the nearest segment.

A second method comprises another transposition whereby the road travelled is determined and this is fitted along a parametrised path as stored in the mass storage device.

Figure 5:
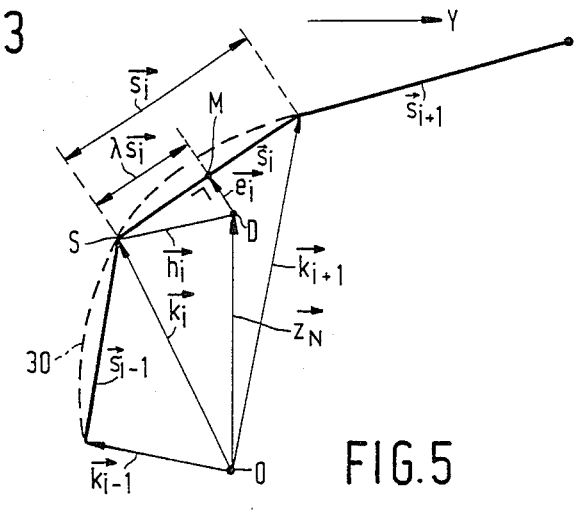
FIG. 5 shows a vector diagram for determining the deviation between the actual vehicle position and the calculated vehicle position.

The mathematics on which the first method is based will be described with reference to the vector diagram given in FIG. 5. In that FIG. 5 a curved segment 30 is represented by means of a number of line sections $s_{i-1}$, $s_i$, $s_{i+1}$ which are bounded by breakpoints. To each breakpoint belongs a position vector $\vec{k}_{i-1}$, $\vec{k}_i$, $\vec{k}_{i+1}$. The point 0 represents the origin of the reference system.

Assume now that during the travel of the vehicle over line section $s_i$ of the road 10 the point D is calculated on the basis of the vehicle path algorithm and the measured values for v and a. Clearly the point D does not belong to the line section $s_i$, so that correction is necessary. From the point D a perpendicular line is drawn to $s_i$, which bisects $s_i$ at the point M. The vector $\overrightarrow{DM}$ is denoted by $\vec{e}_i$ and gives the deviation (correction vector) between the calculated coordinate point D of the vehicle position vector $\vec{z}_n$ and the segment in which the actual vehicle position lies. The vector $\overrightarrow{SD}$ is denoted by $\vec{h}_i$ and OD is denoted by $\vec{z}_n$. We can now write:

$$\vec{s}_i = \vec{k}_{i+1} \vec{k}_i$$

$$\vec{h}_i = \vec{z}_N - \vec{k}_i. \tag{20}$$

The line section SM is a part of the vector $\vec{s}_i$ such that SM can be denoted by $\lambda \vec{s}_i$, where $\lambda$ is a scalar and $0 \leq \lambda \leq 1$. It also applies that:

$$\vec{e}_i = \lambda \vec{s}_i - \vec{h}_i \tag{21}$$

Since $\overrightarrow{DM} \perp \vec{s}_i$, it now holds that $\vec{e}_i \perp \vec{s}_i$ and thus that their product is $$(\vec{e}_i, \vec{s}_i) = 0 \tag{22}$$

Substituting equation (21) in (22) yields $$(\vec{e}_i, \vec{s}_i) = (\lambda \vec{s}_i - \vec{h}_i, \vec{s}_i)$$

$$0 = \lambda(\vec{s}_i, \vec{s}_i) - (\vec{h}_i, \vec{s}_i)$$

$$\lambda = \frac{(\vec{h}_i, \vec{s}_i)}{(\vec{s}_i, \vec{s}_i)} \tag{23}$$

The value of $\lambda$ can now be calculated by substituting the x and y values of the vectors $\vec{z}_N$, $\vec{k}_i$ and $\vec{k}_{i+1}$ in equation (24) and calculating their products. Substituting equation (20) in (21) yields:

$$\vec{e}_i = \lambda \vec{s}_i - \vec{k}_i \tag{25}$$

From equation (25) and by substituting the calculated value of $\lambda$, one can now determine $\vec{e}_i$ and $|\vec{e}_i|$.

The correction of the calculated coordinates of the vehicle position vector with the aid of the actual road position coordinates from the digitised road network can be implemented in various ways. A first preferred embodiment will be described with reference to the flow chart shown in FIGS. 6a to 6e. The flow chart shown in FIG. 6a is that of a main program which is executed under control of the first microprocessor (1 in FIG. 2) of the vehicle navigation system. The flow chart shown in FIG. 6b is that of the subroutine "determination of segment" which is likewise executed by the first microprocessor. The flow charts shown in FIGS. 6c and 6d are those of the subroutines "determination of $\vec{e}$, $\lambda$" and "determination of $\vec{e}$, breakpoints", respectively, which are preferably executed under control of the second microprocessor. The flow chart shown in FIG. 6e is that of the "correction subroutine", which is also preferably executed by the second microprocessor. The control unit 1, the working memory 2, the mass storage device 3 and the position-locating means 12 thus operate as a correction unit.

The main program for the operations of the correction unit (FIG. 6a) is executed at least once per segment and for segments are longer than, say (>700 m), the main program is periodically repeated for example every 10 to 20 seconds, depending on the accuracy of the position-locating devices.

After starting of the main program (140) a first correction signal is generated (141) for handling the subroutine "determination of segment". The handling of the subroutine "determination of segment" also implies the handling of the subroutines "determination of $\vec{e}$, $\lambda$" and "determination of $\vec{e}$, breakpoints" (142). With the result from the preceding subroutines a "correction subroutine" (143) is then completed. This correction subroutine may possibly be supplemented with the subroutine "change of driving direction" (144). Terminating the subroutine "change of driving direction" also signifies the termination (145) of the main program.

The subroutine "determination of segment" (FIG. 6b) is started (50) as a part of the main program. This subroutine begins with an investigation (51) of whether the vehicle is still located in the same segment. This investigation is done for example by checking on the basis of the route description the results of a previous execution of the subroutine "determination of segment" and the speed of the vehicle, for the segment that was driven into in the said previous execution. Further, a check is also made here on whether the vehicle is still situated near a nodal point (in a radius of ±300 m around the nodal point), in which case an indicator is set.

If the vehicle is still in the same segment (Y) then a move is immediately made to step 57 where a jump operation is performed to the subroutine "determination of $\vec{e}, \lambda$". If, on the contrary, the vehicle is no longer in the same segment (N), or if an indicator has been set, then a selection is made (52) of a group of segments situated within a given radius (for example 350 m) around the calculated vehicle position as represented by the generated vehicle position coordinates. This selection is made by using the data block belonging to the last-determined segment and taking account of the direction in which the vehicle is moving, by selecting the data blocks of the adjoining segments. The number ($\gamma$) of segments from the said group is then counted (53) and a first counter with that value ($\gamma$) is initialised (54). Next, a first segment is selected from the said adjoining segments (55) and the first counter is reduced by one position ($\gamma:=\gamma-1$) (56). Then a jump operation is made to the subroutine "determination of $\vec{e}, \lambda$". After execution of the subroutine "determination of $e, \lambda$" the value determined for the correction vector ($\vec{e}$) is stored with the associated segment number in a first table (58). Next a jump is made (59) to the subroutine "determination of $\vec{e}$, breakpoints". Then a check is made (60) of whether the first counter has reached zero ($\gamma=0$?), other words to determine whether the subroutine "determination of $\vec{e}, \lambda$" and the subroutine "determination of $\vec{e}$, breakpoints" have been executed for each of the said segments of that group.

If the first counter has returned to zero (Y) then the smallest e value $\vec{e}^{(k1)}$ is selected (62) from the $\vec{e}$ values stored in the first table. This smallest $\vec{e}$ value $\vec{e}^{(k1)}$ with its associated segment number is stored in a first register. This terminates the segment determination subroutine (63). If the first counter has not returned to zero (N), then a subsequent segment from the said group of segments is selected (61) and the subroutine "determination of segment" is repeated starting from step 56.

Figure 7A:
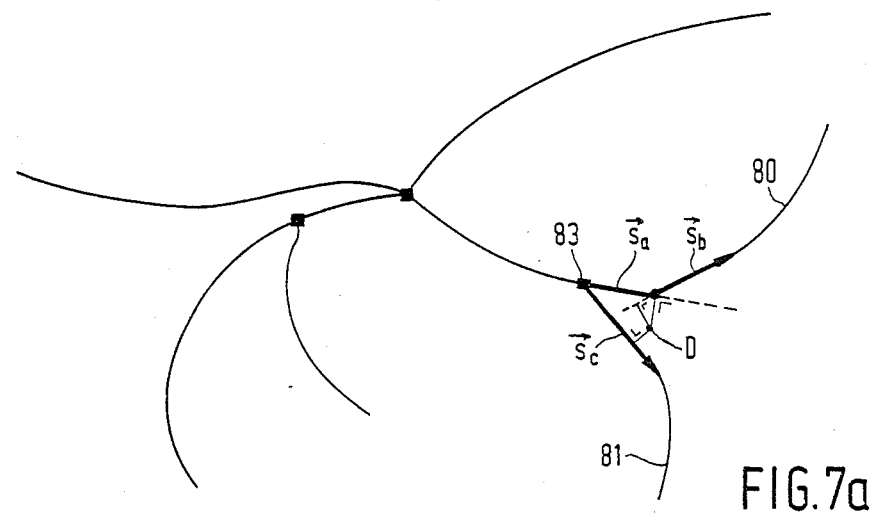
FIG. 7a shows the choice from among different roads of a road network for selecting the road to which calculated vehicle position coordinates belong.

The execution of the subroutines 57 and 59 for all the segments of the group is important for determining which way the vehicle is going to travel after the nodal point has been passed, and in so doing also to determine the relevant segment with respect to which correction operations are to be carried out. In a situation as depicted in FIG. 7a, the vehicle that is situated at nodal point 83 may take either road 80 or road 81. In a transposition formed by the perpendicular projection of the calculated point D onto the line sections $\vec{s_a}$ or $\vec{s_b}$ belonging to road 80, the perpendicular line from D bisects the line sections $\vec{s_a}$ or $\vec{s_b}$ in their extension. This has the consequence that the value for $\lambda$ upon projection onto $\vec{s_a}$ or $\vec{s_b}$, respectively, is larger than one or smaller than 0, respectively, i.e. $\lambda \epsilon [0,1]$ and the transposition is consequently invalid. The segment of road 80 is thus evidently not the road along which the vehicle is moving. The choice of another road and thus of another segment is necessary. The other segment is for example that belonging to road 81 which lies in the vicinity of road 80 and moreover has a nodal point 83 in common with road 80. The perpendicular projecton of D on to $\vec{s_c}$ will now yield a valid value for $\lambda$ that lies between 0 and 1.

The flow chart depicted in FIG. 6c illustrates the different steps of the subroutine "determination of $\vec{e}, \lambda$". With this subroutine a transposition is determined of the calculated vehicle position coordinate to a line section of a segment belonging to the said group and also a value for the correction vector $\vec{e}$.

The subroutine "determination of $\vec{e}, \lambda$" is started (120) as a part of the subroutine "determination of segment" (step 57). The subroutine "determination of $\vec{e}, \lambda$" begins (121) by calling up the most recent vehicle position coordinates for the position vector $\vec{z_N}$ as calculated by means of the vehicle path algorithm. The vehicle position coordinates are calculated under control of the position-locating devices and are for example temporarily stored in the internal memory. After the calculated vehicle position coordinates for $\vec{z_N}$ have been called up (122) and a second counter started (i=1) which counts the number of line sections contained in the segment, the coordinates of the first ($s_i$) line section belonging to that segment are determined. With the value for $\vec{z_N}$ and the value for $s_1$, a determination (123) is now made (as given by the expressions (20) and (23)) of the value of $\lambda$ and this is stored in a section table.

Next, a check is made (124) with the $\lambda$ key whether $0 \leq \lambda \leq 1$. If $\lambda$ indeed has a valid value between the number 0 and the number 1 (Y), then the vector $\vec{e_1}$ for the line section $s_1$ is determined (125) (as given by expression (25)) and also its length $|\vec{e_1}|$ being the distance between the calculated coordinate point $\vec{z_N}$ and the transposed coordinate point of $\vec{z_N}$. Two alternatives are now possible for the subroutine "determination of $\vec{e}, \lambda$".

In a first alternative a check is made (126) whether $|\vec{e_1}|$ is smaller than a given distance L. For this purpose for example L=maximum is placed at step 122. If $\vec{e_1}$ is smaller than L (Y), as it will be when L=maximum, then the value of $|\vec{e_1}|$ is substituted for L (127). By substituting in this way a smaller value $|\vec{e_1}|$ for the value of L whenever $|\vec{e_i}| < L$, the smallest value of $|\vec{e_i}|$ is ultimately selected for this connection vector.

In a second alternative the steps 126 and 127 are not executed but at step 125 the calculated value for $|\vec{e_i}|$ is directly stored in the first table and a jump is then immediately made to step 128. Depending on the desired execution, either one of both alternatives can be selected.

At step 128 the second counter is now raised by one position (i:=i+1) in order to examine a subsequent section from the segment. Next a check is made (129) to determine whether all sections of the relevant segment have already been examined (i<m?). This is done by comparing the position of the second counter with the number of sections of the relevant segment. If all sections have not been taken into account (N), then the subroutine is repeated from step 123 for a subsequent section ($s_{i+1}$).

If on the other hand all sections of the relevant segment have been taken into account (Y), then the subroutine "determination of $\vec{e}, \lambda$" is ended for the relevant segment and a jump is again made to the subroutine "determination of segment" (130) in order to store the calculated $\vec{e}$ values in the first table (58) if the first alternative was chosen.

Figure 7B:
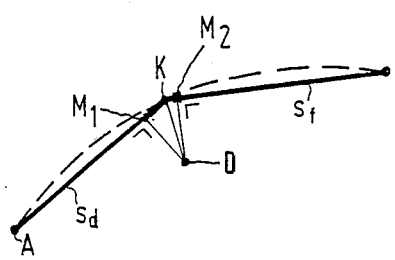
FIGS. 7b and 7c show validity criteria for position co-ordinates transposition.

The subroutine "determination of $\vec{e}\lambda$" gives a first possibility of determining one or more values of the correction vector $\vec{e}$, by making use of the $\lambda$ key. Now it may follow from the $\lambda$ key for the various sections that either several values of λ satisfy and thus several $\vec{e}$ values are determined, or no single value of λ satisfies and thus no valid $\vec{e}$ values are determined. A situation where several values are determined for $\vec{e_i}$ is for example presented in FIG. 7b.

It is assumed that point D represents the coordinate position of the calculated vehicle position vector $\vec{z_N}$. With perpendicular projection of D onto $s_d$, the perpendicular line from D bisects $s_d$ and $M_1$, and with perpendicular projection of D onto $s_f$ the perpendicular line from D bisects $s_f$ at $M_2$. Since now the transposed point $M_1$ is a point that belongs to section $s_d$ and the transposed point $M_2$ is a point that belongs to section $s_f$, then $\vec{AM_1} = \lambda_1 \vec{s_d}$, $\vec{KM_2} = \lambda_2 \vec{s_f}$ and both $0 \leq \lambda_1 \leq 1$ and $0 \leq \lambda_2 \leq 1$.

With step 124 of the subroutine "determination of $\vec{e}$, λ" it is thus established that both $\lambda_1$ and $\lambda_2$ satisfy the imposed criterion (λ-key) and in this way both $\vec{e_1} = \vec{DM_1}$ and $\vec{e_2} = \vec{DM_2}$ are determined. In the first table there are in this case two values for $\vec{e_i}$.

Figure 7C:
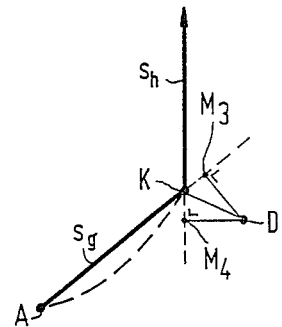

A situation where no single value for $\vec{e_i}$ is determined in the handling of the subroutine "determination of $\vec{e}$, λ" is shown for example in FIG. 7c. Assume again that the point D represents the coordinate position of the calculated vehicle position vector $\vec{Z_n}$. With perpendicular projection of D onto $s_g$ the perpendicular line from D bisects the on extension of section $s_g$ at the point $M_3$. Likewise the perpendicular line from D onto $s_h$ bisects $s_h$ in its extension at the point $M_5$. Now $\vec{AM_3} = \lambda_3 \vec{s_g}$ $\vec{KM_4} = \lambda_4 \vec{s_h}$, where $\lambda_3 > 1$ and $\lambda_4 < 0$.

Since now neither of the two values $\lambda_3, \lambda_4$ satisfy the criterion ($0 \leq \lambda \leq 1$) imposed in the investigation of step 124, no values are determined for $\vec{e_i}$.

FIG. 6d shows the flow chart of the subroutine "determination of $\vec{e}$, breakpoints". This subroutine is started (131) during step 59 of the subroutine "determination of segment". The subroutine "determination of $\vec{e}$, breakpoints" is in fact supplementary to the subroutine "determination of $\vec{e}$, λ" and is thus a preferred embodiment of the functioning of a vehicle navigation system in accordance with the invention.

The subroutine "determination of $\vec{e}$, breakpoints" begins (132) with the counting of the number (β) of breakpoints in the relevant segment. The subroutine "determination of $\vec{e}$, λ" and the subroutine "determination of $\vec{e}$, breakpoints" are always completed successively for the same segment as also appears from the flow chart of the subroutine "determination of segment" which is shown in FIG. 6b.

A third counter is next (133) positioned in a position β which gives the number of breakpoints just counted. The position of the third counter is then (134) investigated. If this position is zero (Y) (all breakpoints dealt which, or there is no single breakpoint in that segment because it is a straight road), then this subroutine is ended and a jump is again made to the subroutine "determination of segment" (139). If, however, the position of the third counter has a value different from zero (N), then (135) the coordinates of the breakpoint Kβ indicated by the position of the third counter are called up in order thereafter to determine (136) the distance dβ(D, Kβ) between the point D and the breakpoint Kβ (see FIGS. 7b and 7c). This distance dβ(D, Kβ) = eβ yields a supplementary value for $\vec{e}$, namely $\vec{e_\beta} = \vec{Z_N} - \vec{K_\beta}$, which is then stored (137) in the first table together with the segment number. Then the third counter is reduced (138) by one unit and the subroutine "determination of $\vec{e}$, breakpoints" is repeated from step 134.

By making use of the subroutines "determination of $\vec{e}$, λ" and "determination of $\vec{e}$, breakpoints" a series of values for the correction vector $\vec{e}$ is stored in the first table. At step 62 of the subroutine "determination of segment" the smallest value $\vec{e}^{(k1)}$ for $\vec{e}$ is then selected from this series. The segment number that belongs to the smallest value of $\vec{e}$ is then used to identify the segment in which the vehicle is situated at a given moment.

The value $\vec{e}^{(k1)}$ is further used in the handling of the correct subroutine depicted in FIG. 6e. The correction subroutine is started (70) on command from the first data processing unit in the execution of the main program (step 143, FIG. 6a). In this correction subroutine it is checked (71) whether that smallest value $\vec{e}^{(k1)}$ is smaller than a norm value, for example $\vec{e}_{norm} = 20$ m ($\vec{e}^{(k1)} < \vec{e}_{norm}$). If that smallest value $\vec{e_i}(k1)$ is smaller (Y) than the norm value $\vec{e}_{norm}$, then a correction of the calculated vehicle position is superfluous and the correction subroutine is thereby terminated. If, on the other hand, the smallest value $\vec{e_i}(k1)$ is greater than $\vec{e}_{norm}(N)$, then this means that the deviation is too great and that a correction must be made. The correction is now done (72) by vectorially adding $\vec{Z_N}^{(M)} = \vec{Z_N} + \vec{e_i}^{(k1)}$, in other words that smallest value of $\vec{e_i}^{(k1)}$, to the calculated vehicle position vector $\vec{Z_N}$. The corrected value $\vec{Z_N}^{(M)}$ can now be used in as the reference position for calculating the next vehicle position coordinates by means of the vehicle path algorithm. After determination of that corrected value $\vec{Z_N}^{(M)}$ a step is made back again to the main program.

Figure 8:
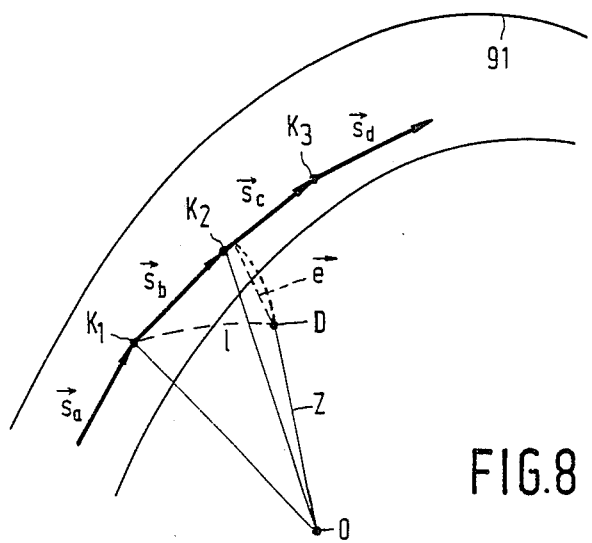
FIG. 8 shows the parametrisation of a part of a road to be used for transposition of the road travelled.

Yet another method for correcting the calculated vehicle position coordinates for the vehicle position vector is the "matching method" which entails calculating the travelled path and matching it along the actual path. This other method is illustrated with reference to the example in FIG. 8. The vehicle moves along the part of the road 91 which is parametrised by the set of sections $s_a$, $s_b$, $s_c$ and $s_d$ and by the breakpoints $K_1$, $K_2$ and $K_3$.

Assume that the breakpoint $K_1$ represents the position defined by the road position coordinates that were obtained in a previous correction procedure (or are the coordinates for the initial road position). After the vehicle has driven a further time Δt after the execution of the previous correction procedure, it has travelled from the reference point $K_1$ a calculated distance $1 = v\Delta t$ (v being the average speed of the vehicle in the time Δt) and on the basis of the vehicle path algorithm the coordinates of the point D are determined. Since the vehicle can only move over the road 91, it must hold that $$1 = \lambda_1 |\vec{s_b}| + \lambda_2 |\vec{s_c}| + \lambda_3 |\vec{s_d}| \qquad (30)$$

$$0 \leq \lambda_i \leq 1 \qquad i \in \{1,2,3\} \qquad (31).$$

Although this equation (30) contains three unknowns, namely $\lambda_1$, $\lambda_2$ and $\lambda_3$, it can nevertheless be solved if account is taken of the boundary conditions given in (31) as also below:

when $1 > |\vec{s_b}|$ then $\lambda_1$ must be equal to 1 (32)
when $1 > |\vec{s_b}| + |\vec{s_c}|$ then $\lambda_1$ must be equal to 1 and $\lambda_2$ must be equal to 1 (33).

These two boundary conditions are based on the fact that $K_1$ gives the starting point from which 1 has to be measured along the road 91 and on the fact that the vehicle can move only along the road. The example given in FIG. 3 shows that $1 > |\vec{s_b}|$, but $1 < |\vec{s_b}| + |\vec{s_c}|$, so that $1 = |\vec{s_b}| + \lambda_2 |\vec{s_c}|$.

The transposed coordinates of the vehicle position vector are thus for the position. $\vec{K_2} + \lambda_2 \vec{K_3}$.

Also determined is the distance $|\vec{e}|$ between the point D and this transposed position.

$$\vec{e} = (\vec{K_2} + \lambda_2 \vec{K_3}) - \vec{Z}$$

$$|\vec{e}| = |\vec{K_2}| + \lambda_2 \vec{K_3} - \vec{Z} \qquad (34)$$

The determination of the value 1, the scalars $\lambda_i$, the vectors $\vec{K_2} + \lambda_2 \vec{K_3}$, $\vec{e}$ and $|\vec{e}|$ is done by means of the first and/or the second microprocessor. When this matching method is used it is of course also possible, as described for the use of perpendicular projection, to transpose the calculated road travelled 1 to more than one nearby segment and then to select from these the smallest value of the correction vector.

A supplementary method of correcting the calculated vehicle position coordinates is for example given by the subroutine "change of driving direction" for which the flow chart is shown in FIG. 9. The subroutine "change of driving direction" is used in addition to the correction subroutine (FIG. 6e) or to the above-described "matching method". The subroutine "change of driving direction" is, however, not of essential importance for the functioning of a navigation system in accordance with the invention, so that in a simple implementation of a navigation system in accordance with the invention it might possibly be omitted.

The subroutine "change of driving direction" is started (184) as a part of the main program (step 144) and is handled preferably under the control of the section microprocessor. The first step (85) that is completed in this subroutine contains the calling up of the momentary value of the direction angle $\phi$ as calculated from the vehicle path algorithm. This value of the direction angle is temporarily stored in a register. Next to be detected (86) is whether in accordance with the represented path the momentary value of the direction angle has changed appreciably with respect to the preceding value of the direction angle which is also stored in that register. An appreciable change of the value of the direction angle can in certain circumstances imply that the vehicle has driven over a nodal point or a break point and has proceeded in a different direction. If the value of the direction angle is not (N) appreciably changed, then a shift is made to step 89 and with this the subroutine "change in driving direction" is ended. If on the contrary the value of the direction angle has (Y) appreciably changed, then (90) a second correction signal is generated by the second microprocessor and under the control thereof current driving routine coordinates are called up from the working store. These driving route coordinates contain data on the road network in a radius (approx. 100 m) around the last calculated vehicle position. With the aid of these driving route coordinates a check is now made (87) to determine whether the vehicle is situated at a nodal point or a breakpoint. If the vehicle is indeed (Y) situated at a nodal point or breakpoint, then a third correction signal is generated (88) and under control thereof coordinates of that nodal point or breakpoint are substituted (88) for the calculated coordinates of the vehicle position vector. If however, the vehicle is not situated at a nodal point or breakpoint (87, N) then after step 87 a jump is directly made to step 89. It would also be possible after step 87 and in the event that the vehicle is not situated at a nodal point to investigate whether the vehicle has made an about turn. This latter information could then be processed or used for correction purposes.

The correction vector $\vec{e}$ and its length $|\vec{e}|$ indicating the deviation between the calculated position coordinates and the transposed coordinates and which has been determined by one of the methods described in the foregoing can also be used for applying a correction to the measured value of the lateral acceleration a, as determined by the accelerometer.

As already mentioned, simple accelerometers yield an insufficiently accurate measuring result, so that a correction has to be made to the result. Another factor that influences the accuracy of the result of a measurement with a simple accelerometer in a vehicle is the tilting of the vehicle around an equilibrium position, for example as a consequence of a passenger stepping in or when the vehicle drives into a corner at high speed. FIG. 10a shows a vehicle in equilibrium and FIG. 10b shows a vehicle that has tilted by an angle $\psi$, called the tilting angle, around the equilibrium position (g represents the acceleration due to gravity). As a consequence of that tilting angle and acceleration error of the magnitude g sin $\psi$ will be measured. A correction must be made for this.

The conversion of the analog measured speed and acceleration values into digital values, the calculation of the path algorithm, in short the entire vehicle navigation system, makes use of electronic components. The operation of electronic components is influenced by the considerable temperature fluctuations and differences to which a vehicle is subjected (ranging from nearly $-40°$ C. to $+70°$ C.). For this, too, correction is necessary.

The determination of a correction value $\Delta$ a applicable to the measured lateral acceleration will be described with reference to FIGS. 11a and 11b. FIG. 11a gives an example of a hardware implementation of a part of the correction unit, which part generates the correction value $\Delta a$. The correction unit contains an operator generator 200 which has inputs for receiving the measured speed (v) and acceleration (a) as well as the calculated vehicle position vector $(\vec{z_N})$. This operator generates from the received quantities an acceleration operator $\vec{g_n}$ in a manner which will be elucidated in the further description. The acceleration operator is applied to an input of an operation unit 201, in which further the correction vector $\vec{e}^{(k1)}$ and a fourth correction signal (4C) generated by the first microprocessor are applied. The operation unit 201 under control of the fourth correction signal causes the acceleration operator to act on the applied correction vector and generates therefrom a correction value $\Delta a$.

The generation of the acceleration operation $\vec{g_n}$ and the correction value $\Delta a$ will now be further elucidated with reference to the flow chart of the a-correction program depicted in FIG. 11b.

The a-correction program starts (100) as shown as the vehicle navigation system is initialised. The a-correction program begins (101) by setting a fourth counter to zero (k=0) as well as by storing an initial value for the correction value $\Delta a_k$ (for example $\Delta a_0 = 0$) in a second register. Thereafter (102) a fifth counter is set to zero (n=0) and the initial value of the direction angle ($\phi = \phi_0$) is stored in third register. Next (103) the speedometer and the accelerometer are sampled in order to call up the value $v_{n+\frac{1}{2}}$ and $a_{n+\frac{1}{2}}$ (see equation 14) and store these values in a fourth register of the operator generator. To the measured value of the acceleration the position-locating means now apply a correction (104), namely $a_{n+\frac{1}{2}} - \Delta a_k$. With this corrected value for the acceleration the vehicle position vector $\vec{z}_{n+1}$ is now calculated (105) by making use of the vehicle path algorithm (equation 14). The result of the calculation of $\vec{z}_{n+1}$ is stored for example in an internal memory of the second microprocessor unit. After calculation of the vehicle position vector $\vec{z}_{n+1}$ an acceleration operator $\vec{g}_n$ is now determined, which acceleration operator $\vec{g}_n$ indicates the sensitivity of the vehicle position vector to errors in the acceleration signal. For $\vec{g}_n$ it holds that:

$$g_n \Delta a_k \approx \vec{e}_{10} \tag{40}$$

or $(g_n)^{-1} \vec{e}_n = \Delta a_k$ where $(\vec{g_n})^{-1}$ represents the inverse of the acceleration operator and $\vec{e}_n$ is the correction vector (see equation 21). Thus $$\vec{e}_N = \vec{z}_N - \vec{z}_n{}^{(M)} \tag{41}$$

where $\vec{z}_{N+1}{}^{(M)}$ represents the converted vehicle position vector as determined at step 72 of the correction subroutine in FIG. 6e. Proceeding from the initial value of the vehicle position vector $\vec{z}_0$ the vehicle position vector $\vec{z}_1$ can be determined with the help of the vehicle path algorithm and the values $v_{\frac{1}{2}}$, $a_{\frac{1}{2}}$ from the equation:

$$\vec{z} = f(\vec{z_0}, v_{\frac{1}{2}}, a_{\frac{1}{2}}) \tag{42}$$

where $\vec{f}$ represents the vehicle path algorithm. One now has $$a_{\frac{1}{2}} = a'_{\frac{1}{2}} + \Delta a_0 \tag{43}$$

where $a'_{\frac{1}{2}}$ represents the real value of the acceleration. Substituting (43) in (42) now yields $$\vec{z}_1 = f(\vec{z_0}, v_{\frac{1}{2}}, a_{\frac{1}{2}} + \Delta a_0) \tag{44}$$

If now $\Delta a_0$ is very much less than the nominal value of the lateral acceleration, for example r.m.s. a, then a first order Taylor series approximation can be written for formula (44).

$$\vec{z}_1 = \vec{f}(\vec{z_0}, v_{\frac{1}{2}}, a_{\frac{1}{2}}) + \left.\frac{\partial f}{\partial a'}\right|_0 \cdot \Delta a_0 \tag{45}$$

where $\left.\frac{\overrightarrow{\partial f}}{\partial a'}\right|_0$ is the derivative of $\vec{f}$ to a' for n=0. If the speedometer is sufficiently reliable, when $v_{\frac{1}{2}}$ is a reliable value and $$\vec{f}(\vec{z_0}, v_{\frac{1}{2}}, a_{\frac{1}{2}}) = \vec{z}_1{}^{(M)} \tag{46}$$

We now define:

$$\vec{g_0} = \left.\frac{\overrightarrow{\partial f}}{\partial a'}\right|_0 \tag{47}$$

Substituting (46) and (47) in (45) gives $$\vec{z}_1 = \vec{z}_1{}^{(M)} + \vec{g_0} \Delta a_0 \tag{48}$$

Making use of the vehicle path algorithm and of the calculated vehicle position vector $\vec{z}_1$, the vehicle position vector $\vec{z}_2$ is determined in a subsequent treatment of step 105.

$$\vec{z_2} = f(\vec{z_1}, v_{1\frac{1}{2}}, a_{1\frac{1}{2}}) \tag{49}$$

Equation 49 can also be written as $$\vec{z_2} = f(\vec{z}_1{}^{(M)} + (\vec{z_1} - \vec{z}_1{}^{(M)}), v_{1\frac{1}{2}}, a'_{1\frac{1}{2}} + \Delta a_0) \tag{50}$$

Development of this in a Taylor series then gives:

$$\vec{z_2} = \vec{f}(\vec{z}_1{}^{(M)}, v_{1\frac{1}{2}}, a'_{1\frac{1}{2}}) + \left[\left.\frac{\overrightarrow{\partial f}}{\partial z^{(M)}}\right|_1\right](\vec{z_1} - \vec{z}_1{}^{(M)}) + \left.\frac{\overrightarrow{\partial f}}{\partial a}\right|_1 \Delta a_0 \tag{51}$$

Substituting (48) in (51) and re-arranging (51) then gives $$\vec{z_2} = \vec{z_2}{}^{(M)} + \left[\left.\frac{\overrightarrow{\partial f}}{\partial z^{(M)}}\right|_1 \vec{g_0} + \left.\frac{\overrightarrow{\partial f}}{\partial a}\right|_1\right]\Delta a_0 \tag{52}$$

We now defined $$\vec{g_1} = \left.\frac{\overrightarrow{\partial f}}{\partial z^{(M)}}\right|_1 \vec{g_0} + \left.\frac{\overrightarrow{\partial f}}{\partial a}\right|_1 \tag{53}$$

Then $$\vec{z_2} = \vec{z_2}{}^{(M)} + \vec{g_1} \Delta a_0 \tag{54}$$

In general it can thus be derived that the acceleration operation $\vec{g}_n$ is given by $$\vec{g}_n = \left.\frac{\overrightarrow{\partial f}}{\partial z^{(M)}}\right|_n \vec{g}_{n-1} + \left.\frac{\overrightarrow{\partial f}}{\partial a}\right|_n \tag{55}$$

Equation (55) thus gives a general expression for the determination of $g_n$.

Returning to the a correction program (FIG. 11b) the value for $\vec{g_n}$ is then determined in step 106 using equation (55). Next, a check is made (107) to determine whether a new value for the correction vector $\vec{e}_k{}^{(k1)}$ is already known (the value $\vec{e}_k{}^{(k1)}$ is determined as described in the foregoing). If no value is yet known for $\vec{e}_k(N)$ then the fifth counter is increased by one position (108) and the program is repeated from step 103. If on the contrary a new value is known for $\vec{e}_k{}^{(k1)}$ (Y) then this is retrieved from the first register (109) together with the real coordinates of the vehicle position vector $\vec{z}(M)$. Next (110), using the operation unit, a value for $\Delta \vec{a}_k$ is determined from $$\hat{z}_n = \vec{z}_n{}^{(M)} + \vec{g}_n \Delta \vec{d}_k \tag{60}$$

This new value for $\Delta \vec{a}_k$ is now stored in the second register (111) where it replaces the present value $\Delta \vec{a}_{k-1}$. The fourth counter too is increased by one position. With this new value for $\Delta a_k$ and with the fourth counter in a subsequent position the a-correction program is repeated from step 102. At this step 102 the value $\phi_N{}^{(M)}$ is determined from $z_N{}^{(M)}$ for the direction angle and stored in the third register.

By the application of a correction value $\Delta \vec{a}_k$ to the measured acceleration value, constant and slowly changing errors in the measured lateral acceleration are eliminated. These measures thus offer the possibility of using a simple and thus relatively cheap accelerometer in the vehicle navigation system in accordance with the invention. The correction of the measured lateral acceleration has positive consequences for calculating the vehicle position vector $\vec{z}_{n+1}$ with the position-locating devices. When now instead of the measured value the $\Delta a_k$ corrected value is filled into the vehicle path algorithm $f(\vec{z}_n, v_{n+\frac{1}{2}}, a_{n+\frac{1}{2}})$ for $a_{n+\frac{1}{2}}$, then the error in the calculated position coordinates decreases considerably. This latter is shown in an example given in FIG. 12. In that example the vehicle moves along a straight path which coincides with the x axis of the reference system. The vehicle has a speed of 20 m/s and the correction value $\Delta a_0$ is chosen as $\Delta a_0 = 0.5$ m/s$^2$ and the main program was executed every 30 seconds. The vehicle departs from the origin. In a first determination of the correction vector $e_k^{(k1)}$ this has a length of 221.5 m. After application of the correction factor determined with the a correction program the deviation vector $|\vec{e_2}|$ after a second determination is 33 m, and subsequently after a third and fourth determination the deviation vector is $|\vec{e_3}| = 6.7$ m and $|\vec{e_4}| = 1.5$ m respectively.

By making use of a vehicle navigation system in accordance with the invention the vehicle position coordinates can thus be determined with relatively high accuracy.

When now the vehicle is stopped, then in fact the last-determined coordinates are the coordinates of the starting point of the next journey made by the vehicle. Since these last-determined coordinates are now accurately known, they can readily be used as the starting position for the next journey. To this end the central unit is provided with a non-volatile memory, for example incorporated in the position-locating means, in which non-volatile memory these last-determined vehicle position coordinates are stored. The non-volatile memory is for example powered by the storage battery of the vehicle and is charged under control of a charging pulse generated upon stopping the vehicle, for example from the switching-off of the ignition.

Using a correction value $\Delta a_k$ on the measured value for the acceleration, as well as the determination of a correction vector $\vec{e}$ are means which serve to determine the vehicle position coordinates more accurately. An alternative way of determining the vehicle position coordinates is to use a radio or satellite navigation system. A known, already operative, radio navigation system is LORAN-C which is capable of determining a position to an accuracy of approximately 100 m. An example of a known satellite navigation system is the GPS (Global Positioning System—code name NANSTAR) which will be capable of determining a position to an accuracy of approximately 5 m. Further data on the systems LORAN-C and GPS, respectively, are stated, for example, in the articles "Current developments in LORAN-C" by R. L. Frank, Proceedings of IEEE, Vol. 71, No. 10 October 1983, pp. 1127–1139 and "Civil GPS from a future Perspective" by T. A. Stansell, Proceedings of IEEE, Vol. 71, No. 10, October 1983, pp. 1187–1192, respectively.

The determination of a position to an accuracy of approx. 100 m is insufficient for use in a vehicle navigation system, so that the LORAN-C system is not to be considered for this purpose. An accuracy of 5 m on the contrary is useful indeed so that satellite navigation with GPS is to be considered for vehicle navigation. However, the determination of vehicle position coordinates only by means of GPS satellite navigation is insufficient because the signals originating from the satellites are not received continuously and free from distortion. A poor signal reception may arise, for example, from reflection of the radiation by obstacles, for example, high buildings, or by electromagnetic sheet noise. Notably the built-up area where great accuracy of the vehicle position coordinates is required, this type of interferences is particularly annoying.

The combination of a satellite navigation system with the dead reckoning data processing system described hereinbefore provides a solution to mitigation the disadvantages of the two systems individually. As a matter of fact, because the errors in a dead reckoning data processing system are not correlated with those in a satallite navigation system, both systems may be considered to be complementary.

FIG. 13 shows an embodiment of a vehicle navigation system in which a dead reckoning data processing system and a satellite navigation system are combined. The vehicle navigation system comprises analogue elements such as that shown in FIG. 2 (corresponding elements are referred to by the same numerals), as well as a receiver 300 for receiving satellite signals. The receiver 300 is connected to the communication line 4 so that the signals received from the satellite are transmitted to the mass memory and the control unit. Receiving and processing GPS satellite signals is described, for example, in the article by R. J. Nilliken and C. J. Zoller "Principles of operation of NANSTAR and system characteristics". The Institute of Navigation, Global Positioning System, Special Issue, 1980.

The vehicle position coordinates as determined by the dead reckoning data processing system and corrected in the manner described hereinbefore are combined under the control of the control unit 1, with the position coordinates as received by receiver 300 in a mixing unit 301 which forms part of the central unit. The mixing unit mixes the position coordinates in such a manner that an optimum position of the vehicle is obtained. For this purpose the mixing unit comprises a Kalman filter. In the article "Sensitivity Analysis of an integrated NANSTAR GPS/INS Navigation System to component failure" by H. M. Schwartz, published in Journal of the Institute of Navigation, Vol. 30, No. 4, winter 1983-84, pp. 325-337, two examples are given of how position coordinates originating from various sources are mixed by means of a Kalman filter so as to generate one system of position coordinates the accuracy of which is substantially greater than that of the individually presented position coordinates.

In signal processing by means of a Kalman filter for determining the system of combined position coordinates, use is made of the errors associated with each system of presented position coordinates. In fact, each system of presented position coordinates has an error value expressed in a contour of equal probability of position. In the vehicle position coordinates as determined by the dead reckoning data processing system, the value of the correction vector $\vec{e}^{(k l)}$ and/or the correction value a are used in the error value. The error values for the satellite navigation system are mentioned in the above article by H. M. Schwartz.

The combination of the dead reckoning data processing system and a satellite navigation system hence presents the possibility of determining the vehicle position coordinates with greater accuracy and thus realizing a more reliable vehicle navigation system.

What is claimed is:

1. A navigation system for a road vehicle comprising: a measuring unit including a speedometer and an accelerometer for measuring lateral acceleration of the vehicle, a communication unit connected to a central unit for the input of a starting position and a destination and for displaying on a display means a driving route between the starting position and destination, said central unit comprising a mass storage device for storing geographic data of a road network, a control unit and position-locating means and all connected to a common communication line, said central unit including a route-determining unit for determining a driving route between said starting point and the destination by use of the geographic data in the mass storage device, said position-locating means having a first input connected to an output of the measuring unit for receiving measurement data so as to determine from the measurement data, after receiving the starting position, successive vehicle position coordinates and the driving direction of a moving vehicle, and wherein the position-locating means generate recurrently from received measured lateral acceleration and speed of the vehicle successive vehicle position coordinates and driving direction of the moving vehicle.

2. A navigation system as claimed in claim 1 further comprising a correction unit connected to the communication line for determining correction vectors that indicate a deviation between the vehicle position coordinates generated by the position-locating means and stored road position coordinates for a corresponding position on a part of the road, and for correcting the generated vehicle-position coordinates therewith, the geographic data of the road network including a set of segments where each segment represents a part of the road between two nodal points and identified at least by the coordinates of said two nodal points, said correction unit including transposition means for determining, under control of a first correction signal generated by the control unit, for each segment from a group of segments situated within a given radius around a generated vehicle position coordinates, a transposition of the generated vehicle position coordinates for a transposed vehicle position situated near the relevant segment, said transposition means generating correction vectors that give distances between the generated vehicle position and its transposed positions, and said correction unit further comprises means for selecting from the generated correction vectors that vector which has the smallest distance, a correction being made on the basis of the selected correction vector.

3. A navigation system as claimed in claim 2, wherein segments for parts of a road network which run along a straight line form a first subset of the set of segments, and wherein the straight part of a road is represented by one line section, the transposition means determining, for each segment of the first subset, the perpendicular projection of the generated vehicle position coordinates onto the line section of the relevant segment, and means for validating the transposition when the transposed position is a point of that line section.

4. A navigation system as claimed in claim 3, wherein segments for parts of a road network which follow a curved line form a second subset of the set of segments and with the curved part of a road represented by a number of line sections, the transposition means determining, for each segment of the second subset, the perpendicular projection of the generated vehicle position coordinates onto at least one line section of said number of line sections, and means for validating the transposition when the transposed position is a point of one of the line sections.

5. A navigation system as claimed in claim 4, wherein a point of intersection of two successive line sections forms a breakpoint and the transposition means perform a transposition by determining the distance between the generated vehicle position coordinates and at least one breakpoint.

6. A navigation system as claimed in claim 2, wherein for each segment the axis of the appertaining part of the road is parametrised by means of at least one section, and the transposition means perform a transposition by determining the path distance travelled between a reference point of the relevant segment and the generated vehicle position coordinate and subsequently transposing said distance on the sections of the relevant segment with said reference point as the point of departure.

7. A road vehicle navigation device comprising:
(a) a measuring unit comprising an accelerometer for measuring lateral acceleration of the vehicle and a speedometer, and a first output for supplying measured lateral acceleration signal values and speed signal values;
(b) a communication unit which includes input means for inputting a starting position and a destination and display means for displaying at least parts of a driving route between said starting position and said destination; and
(c) a central unit comprising a mass storage device, a control unit, position-locating means and a route-determining unit and all connected to a communication line, said position-locating means being connected to said communication unit for receiving said starting position and to said first output of said measuring unit, said position-locating means being enabled upon reception of said starting position for generating, recurrently, based on said measured speed signal values and lateral acceleration signal values, successive vehicle position coordinates and the driving direction of the moving vehicle, said route-determining unit being connected to said communication unit for determining, under control of said control unit, driving route data between said starting position and said destination by using geographic data of a road network stored in said mass storage device, and means for supplying said driving route data to said display means.

8. A navigation device as claimed in claim 7, wherein said geographic data of the road network includes a set of segments in which each segment represents a road-part of said road network, wherein each of said segments is bounded by two nodal points and contains at least the coordinates of the two nodal points, and said navigation device further comprises a correction unit for generating first correction signals, and connected to said communication line, said correction unit comprising transportation means for determining, under control of a received first correction signal, a number of transposed vehicle position coordinates by applying a transposition of a received vehicle position coordinate, generated by said position-locating means, to path coordinates of a group of segments formed by a number of segments of said set of segments and which are situated within a given radius around said received vehicle position coordinates, said transposition means further generating a number of correction values by determining, for each determined transposed coordinate of said number of transposed coordinates, the distance between said determined transposed coordinate and said vehicle position coordinate, said correction unit further comprising selection means for selecting from said number of correction values the one which has the smallest distance, and said correction unit comprises a correction module for determining a correction vehicle position coordinate by correcting said vehicle position coordinate with the selected correction value.

9. A navigation device as claimed in claim 8, wherein said set of segments comprises a first subset formed by segments which represent a roadpart formed by a substantially straight line and the substantially straight road part is represented by one line section, said transposition means determining said number of transposed coordinates by determining, for each segment of said group of said first subset, the perpendicular projection of said vehicle position coordinate on said line section of the considered segment, and said correction unit comprises means for checking whether said transposed coordinate is a point of that line section and for validating said transposed coordinate if it is a point of that line section.

10. A navigation device as claimed in claim 8, wherein said set of segments comprises a second subset formed by segments which represent a roadpart formed by a curved line and the curved roadpart is represented by a number of line sections, said transposition means determining said number of transposed coordinates by determining, for each segment of said group of said second subset, the perpendicular projection of said vehicle position coordinate on at least one line section of said number of line sections of the considered segment, and said correction unit comprises means for checking whether said transposed coordinate is a point of one of said line sections and for validating said transposed coordinate if it is a point of one of said line sections.

11. A navigation device as claimed in claims 9 or 10, wherein a point of intersection of two successive line sections of said segments forms a breakpoint, said transposition means determining said correction values by determining the distance between said vehicle position coordinate and at least one breakpoint.

12. A navigation device as claimed in claim 8, wherein for each of said segments the axis of the appertaining part of the road is parametrised by means of at least one line section, and said transportation means determines said correction value by determining the distance travelled between a reference point of the relevant segment and said vehicle position coordinate and subsequently transposing said distance on the line sections of the relevant segment with said reference point being the point of departure.

13. A navigation device as claimed in claim 8, wherein said central unit comprises detection means for receiving data representing said driving-direction and for detecting therefrom large momentary changes in said driving direction and for generating a second correction signal upon ascertaining a large momentary change in said driving direction, said detection means being connected with said route-determining unit for retrieving, under control of said second correction signal, momentary driving route coordinates and for ascertaining whether said momentary driving route coordinates contain coordinates of a nodal point or of a breakpoint and, in establishing coordinates of the nodal point or of the breakpoint, generating a third correction signal to control said transposition means to determine a correction value from the third correction signal.

14. A navigation device as claimed in claim 8, wherein said correction unit includes an operator generator for generating an acceleration operator from said measured speed value and lateral acceleration value and from said vehicle position coordinate, said correction unit including an operation unit having a first input connected to said selection unit for receiving said selected correction value, a second input connected to said operator generator for receiving said acceleration operator and a third input connected to said control unit for receiving a fourth correction signal generated by said correction unit, said operation unit causing said acceleration operator to operate on said selected correction value under control of said fourth correction signal to generate therefrom a correction parameter for a measured acceleration value.

15. A navigation device as claimed in claim 14, wherein said operation unit has an output connected to said position-locating means for delivering the correction parameter to said position-locating means which take up the presented correction parameter in the measured lateral acceleration.

16. A navigation device as claimed in claim 8, which comprises a receiving unit connected to the communication line for receiving position coordinate signals originating from a navigation satellite, and wherein said control unit comprises a mixing unit connected to the communication line for mixing, by means of a Kalman filter and under the control of a mixing signal generated by the control unit, generated vehicle position coordinates with position coordinates received from the navigation satellite, wherein the generated vehicle position coordinates and received position coordinates relate to a corresponding vehicle position, and said mixing unit is connected to the correction unit for receiving the correction value and/or the correction parameter.

17. A navigation device as claimed in claim 7 wherein said central unit includes a memory element for temporarily storing data and having a control input for receiving an enabling pulse generated by said position locating means upon stopping of the vehicle, and wherein the memory element stores the generated vehicle position coordinate under control of the enabling pulse thereby to preserve the vehicle position coordinate when the vehicle is stationary.

* * * * *